US011386252B1

(12) United States Patent
Chingudi et al.

(10) Patent No.: US 11,386,252 B1
(45) Date of Patent: Jul. 12, 2022

(54) TECHNIQUES FOR SIMULATION-BASED TIMING PATH LABELING FOR MULTI-OPERATING CONDITION FREQUENCY PREDICTION

(71) Applicant: Apex Semiconductor

(72) Inventors: Pravin Chingudi, Karnataka (IN); Suresh Subramaniam, San Jose, CA (US); Alfred Yeung, San Jose, CA (US); Minkyu Kim, San Jose, CA (US); Pingchun Chiang, San Jose, CA (US)

(73) Assignee: Apex Semiconductor, San Jose, CA (US)

( * ) Notice: Subject to any disclaimer, the term of this patent is extended or adjusted under 35 U.S.C. 154(b) by 0 days.

(21) Appl. No.: 17/194,358

(22) Filed: Mar. 8, 2021

Related U.S. Application Data

(62) Division of application No. 16/894,992, filed on Jun. 8, 2020, now Pat. No. 11,036,908.

(51) Int. Cl.
| | | |
|---|---|---|
| *G06F 30/00* | (2020.01) | |
| *G06F 30/3312* | (2020.01) | |
| *G06F 30/3315* | (2020.01) | |
| *G06N 5/04* | (2006.01) | |

(Continued)

(52) U.S. Cl.
CPC ...... *G06F 30/3312* (2020.01); *G06F 30/3315* (2020.01); *G06N 5/04* (2013.01); *G06N 20/00* (2019.01); *G06F 2119/12* (2020.01)

(58) Field of Classification Search
CPC ............. G06F 30/3312; G06F 30/3315; G06F 2119/12; G06N 5/04; G06N 20/00
See application file for complete search history.

(56) References Cited

U.S. PATENT DOCUMENTS

| | | |
|---|---|---|
| 7,237,213 B2 | 6/2007 | Kusel |
| 7,720,654 B2 | 5/2010 | Hollis |
| 8,290,761 B1 | 10/2012 | Singhee et al. |

(Continued)

OTHER PUBLICATIONS

Non-Final Office Action for U.S. Appl. No. 16/894,992 dated Dec. 2, 2020.

*Primary Examiner* — Naum Levin
(74) *Attorney, Agent, or Firm* — Amin, Turocy & Watson, LLP

(57) ABSTRACT

Techniques improve integrated circuit design by employing multi-operating condition frequency prediction for statically timed designs through spice-based timing path labeling and statistical analysis. Design management component (DMC) can randomly determine and generate sample timing paths based on parameters of characteristics associated with the sample timing paths, the parameters determined based on random seed values; simulate responses of the sample timing paths; and generate vectorized data based on the simulated responses. DMC determines a trained model representing timing path properties and operating conditions of sample timing paths based on statistical analysis of vectorized data. Static timing analysis (STA) component can perform STA on design information of integrated circuitry design and determine an operating condition of a timing path of the design based on the STA. DMC can determine or predict another operating condition(s) associated with the design based on the operating condition and the trained model.

20 Claims, 16 Drawing Sheets

(51) Int. Cl.
*G06N 20/00* (2019.01)
*G06F 119/12* (2020.01)

(56) References Cited

U.S. PATENT DOCUMENTS

| | | |
|---|---|---|
| 8,615,727 B2 | 12/2013 | Ghanta et al. |
| 9,026,965 B2 | 5/2015 | Mogal et al. |
| 9,245,071 B2 | 1/2016 | Katz et al. |
| 9,483,602 B2 | 11/2016 | McConaghy et al. |
| 9,501,608 B1 | 11/2016 | Allen et al. |
| 9,536,036 B1 | 1/2017 | Tzeng |
| 10,114,920 B1 | 10/2018 | Gupta et al. |
| 10,255,403 B1 | 4/2019 | Saurabh et al. |
| 10,810,346 B2 | 10/2020 | Chuang et al. |
| 10,831,954 B1 * | 11/2020 | Sinha .................... G06F 30/398 |
| 11,036,908 B1 * | 6/2021 | Chingudi ............ G06F 30/3312 |
| 2020/0366385 A1 | 11/2020 | Ge et al. |

\* cited by examiner

TECHNIQUES FOR SIMULATION-BASED TIMING PATH LABELING FOR MULTI-OPERATING CONDITION FREQUENCY PREDICTION

CROSS-REFERENCE TO RELATED APPLICATION

This application is a Division of U.S. application Ser. No. 16/894,992 filed on Jun. 8, 2020, the entire contents of which are incorporated herein by reference.

TECHNICAL FIELD

The subject disclosure relates generally to integrated circuit design, e.g., to techniques for simulation-based timing path labeling for multi-operating condition frequency prediction.

BACKGROUND

High-performance integrated circuits traditionally have been characterized by the clock frequency at which they operate. Measuring the ability of a circuit to operate at the specified speed can involve an ability to measure, during the design process, its delay at numerous points. It can be desirable to incorporate the delay calculation into the inner loop of timing optimizers at various phases of the circuit design, such as logic synthesis, layout (e.g., placement and routing of circuit components or elements), and in-place optimizations performed late in the design cycle. While such timing measurements can theoretically be performed using a rigorous circuit simulation, such an approach can be too slow to be practical or useful. One type of circuit simulation that can be employed can be spice simulation.

Another type of circuit analysis, static timing analysis (STA), also can play a useful role in facilitating fast and reasonably accurate measurement of circuit timing of a circuit. The speedup can come from the use of simplified timing models and by largely ignoring logical interactions in the circuit. STA has become a mainstay of circuit design over the last few decades. However, due to increasing complexity of the circuit design process in more recent integrated circuit designs, there can be drawbacks and inefficiencies to using STA to analyze or test integrated circuit designs as well.

The above-described description is merely intended to provide a contextual overview of traditional methods associated with integrated circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an effort to overcome these and/or other deficiencies, in an example embodiment, disclosed herein is a system for determining timing path frequency associated with an integrated circuitry design. The system comprises a design management component that can determine respective sample timing paths of a set of sample timing paths based at least in part on respective characteristics associated with the respective sample timing paths, wherein the respective characteristics can be determined based at least in part on respective random seed values. The design management component can determine a trained model that models timing path properties and operating conditions of the set of sample timing paths based at least in part on timing path information associated with the set of sample timing paths, and wherein the timing path information relates to the respective characteristics associated with the respective sample timing paths. The system also comprises a static timing analysis component that performs a static timing analysis on design information associated with the integrated circuitry design and determines an operating condition of a timing path of the integrated circuitry design based at least in part on the static timing analysis, wherein the design management component determines at least one other operating condition associated with the integrated circuitry design based at least in part on the operating condition and the trained model that models the timing path properties and the operating conditions of the set of sample timing paths.

In another example embodiment, disclosed herein is a method for determining timing path frequency associated with an integrated circuitry design. The method can involve determining, by a system comprising a processor, respective agnostic timing paths of a set of agnostic timing paths based at least in part on respective characteristics associated with the respective agnostic timing paths, wherein the respective characteristics are determined based at least in part on respective random seed values. The method also can comprise determining, by the system, a trained model that represents timing path properties and operating conditions of the set of agnostic timing paths based at least in part on an analysis of vectorized information determined from timing path information relating to the respective characteristics associated with the respective agnostic timing paths. The method further can comprise determining, by the system, an operating condition of a timing path of the integrated circuitry design based at least in part on a static timing analysis performed on design data associated with the integrated circuitry design. The method also can include determining, by the system, at least one other operating condition associated with the integrated circuitry design based at least in part on the operating condition and the trained model that represents the timing path properties and the operating conditions of the set of agnostic timing paths.

In yet another example embodiment, disclosed herein is a machine-readable storage medium, comprising executable instructions that, when executed by a processor, facilitate performance of operations. The operations can comprise determining respective sample timing paths of a set of sample timing paths based at least in part on respective attributes associated with the respective sample timing paths, wherein the respective attributes are determined based at least in part on respective random seed values. The operations also can include generating a trained model that represents timing path properties and operating conditions of the set of sample timing paths based at least in part on an analysis of vectorized data determined from timing path information relating to the respective attributes associated with the respective sample timing paths. The operations further can comprise determining an operating condition of a timing path of a design of integrated circuitry based at least in part on a static timing analysis performed on design data associated with the design of the integrated circuitry. The operations also can comprise predicting at least one other operating condition associated with the design of the integrated circuitry based at least in part on the operating condition and the trained model that represents the timing path properties and the operating conditions of the set of sample timing paths.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
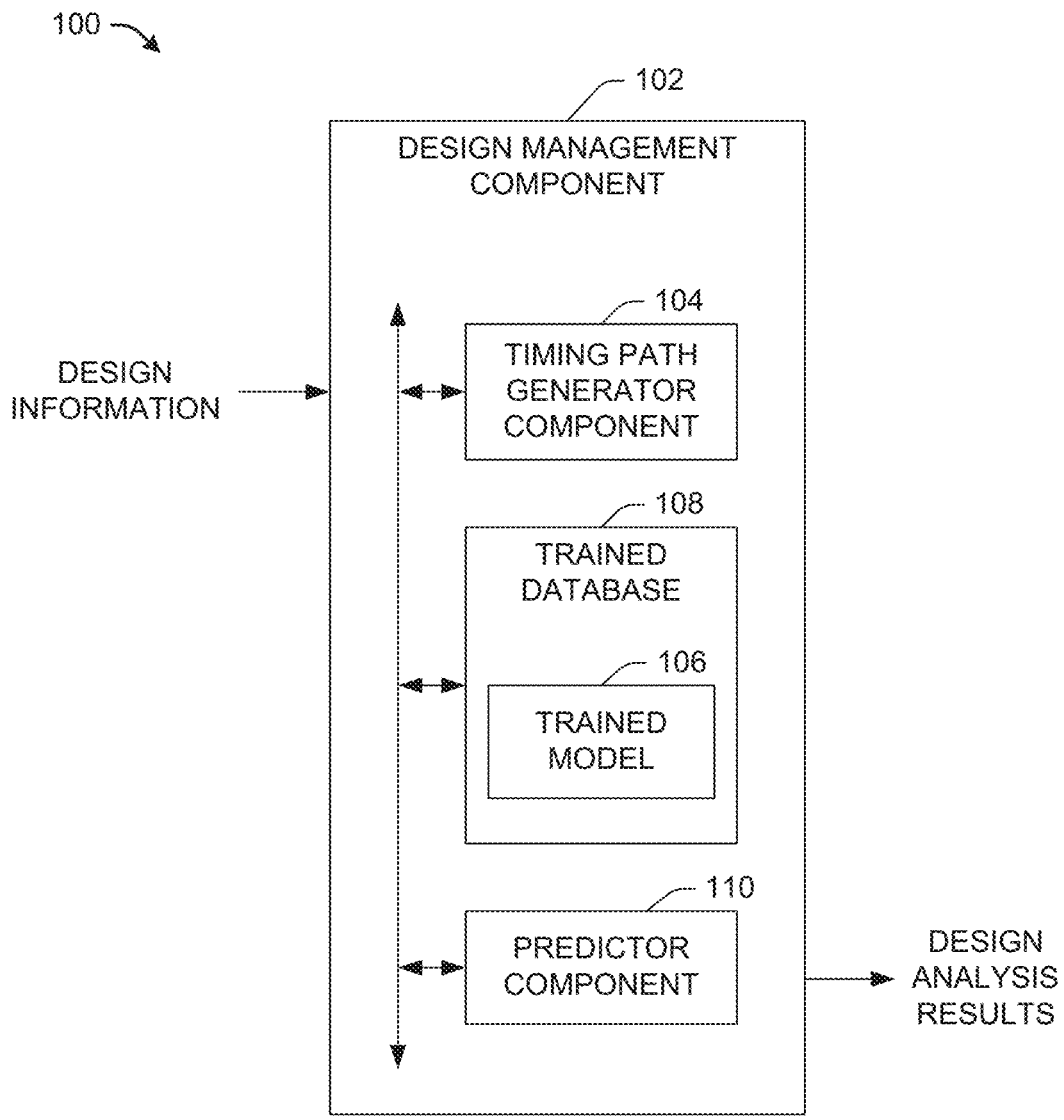
FIG. 1 illustrates a block diagram of an example, non-limiting system that can efficiently enhance a design of an integrated circuit by employing multi-operating condition frequency prediction for statically timed designs through spice-based timing path labeling and statistical analysis, in accordance with various aspects and embodiments of the disclosed subject matter.

The disclosure herein is described with reference to the drawings, wherein like reference numerals are used to refer to like elements throughout. In the following description, for purposes of explanation, numerous specific details are set forth in order to provide a thorough understanding of the disclosed subject matter. It may be evident, however, that various disclosed aspects can be practiced without these specific details. In other instances, well-known structures and devices are shown in block diagram form in order to facilitate describing the disclosed subject matter.

High-performance integrated circuits traditionally have been characterized by the clock frequency at which they operate. Measuring the ability of a circuit to operate at the specified speed can involve an ability to measure, during the design process, its delay at numerous points. It can be desirable to incorporate the delay calculation into the inner loop of timing optimizers at various phases of the circuit design, such as logic synthesis, layout (e.g., placement and routing of circuit components or elements), and in-place optimizations performed late in the design cycle. While such timing measurements can theoretically be performed using a rigorous circuit simulation, such an approach can be too slow to be practical or useful.

Static timing analysis (STA) also can play a useful role in facilitating fast and reasonably accurate measurement of circuit timing of a circuit. The speedup can come from the use of simplified timing models and by largely ignoring logical interactions in the circuit. STA has become a mainstay of circuit design over the last few decades.

However, due to increasing complexity of the circuit design process in more recent integrated circuit designs, statistical STA has been a de facto technique used for timing analysis of circuit designs. Issues related to recent process technology in the case of STA can include, for example, statistical STA can utilize a undesirably and significantly higher amount of timing model characterization to characterize a circuit design, and it can be desirable to analyze many more operating corners for a circuit design to be desirably (e.g., completely or substantially completely) analyzed.

Both of these issues can lead to undesirably longer turnaround time and more resource (e.g., computer resources, time resources, . . . ) commitment, which can result in STA losing its speedup value. Further, there can be significant issues that may not be addressed in STA. Such significant issues can include, for example, each operating condition associated with a circuit design can involve its own timing model characterization, wherein, without it, that corresponding operating condition can end up not being analyzed and potentially can leave a significant design coverage issue. Also, an analysis across all or at least substantially all operating conditions usually can be reserved for very late in the design cycle of the circuit design. While optimization typically can occur in a few dominant analysis conditions, there still can be design targets for all or substantially all operating conditions. Since they may not be analyzed until the end of the design cycle, there typically may not be any room (e.g., time or resources) for design optimization outside of the dominant analysis conditions.

Still another issue with the circuit design process is that, traditionally, data for timing path datasets can be a random collection of timing paths, either derived through a collection of data from an integrated circuit design or a manually crafted set of timing paths. There can be various problems with these types of datasets, including that they can lack coverage, can be design dependent, and/or can contain dataset-driven inaccuracy. For instance, such types of datasets can lack coverage because the timing paths can be created to fit a very specific type of integrated circuit design or can be annotated with manually created timing paths, and, as a result, they typically may not fully encompass the types of timing paths from which an integrated circuit design can potentially be constructed. Such types of datasets also can be design dependent with regard to an integrated circuit design as they can involve utilizing a very specific set of design for any meaningful volume in the dataset, which can result in an undesirably long design process to create the integrated circuit design. This dependency on the design can result in the creation of the dataset being undesirably slow (e.g., very slow or unsuitably slow) because it can involve using a relatively large set of completed design in any specific technology before the appropriate dataset can be created. Further, such types of datasets can be contain data-driven inaccuracy because, without a method to analyze the quality of the dataset and adjust accordingly, the dataset can overfit a very specific type of integrated circuit design without sufficient generalization for overall prediction, which can lead to inaccurate results with regard to the integrated circuit design.

To that end, presented are techniques that can improve integrated circuit design by employing multi-operating condition frequency prediction for statically timed designs through spice-based timing path labeling and statistical analysis. In some embodiments, a design management component (DMC) can create a labeled training dataset that can be utilized for desirably accurate multi-operating condition (e.g., multi-process-voltage-temperature (multi-PVT) condition) frequency prediction, wherein the training dataset can be independent of the design data of an integrated circuit design, or portion thereof, that is under design or consideration, as more fully described herein.

The DMC also can employ analysis techniques and methods that can enhance (e.g., improve, optimize) the quality of the labeled training dataset by identifying holes in the corresponding training dataset. For instance, the DMC can analyze the quality of the training dataset to identify any sparsity that may exist in the training dataset, and can improve the precision of the training dataset through density consistency and/or localized datapoint generation to mitigate (e.g., reduce, minimize, or eliminate) any undesired sparsity that may exist in the training dataset, as more fully described herein.

To generate the training dataset, the DMC can randomly and automatically determine and generate sample (e.g., exemplary or agnostic) timing paths based at least in part on respective characteristics associated with respective sample timing paths. The DMC can determine and generate the sample timing paths independent of the design data of an integrated circuit design, or portion thereof, that is under design or consideration. The DMC can determine the respective characteristics associated with the respective sample timing paths (e.g., characteristics of logic gates, components, or wires, . . . , of sample timing paths) based at least in part on respective random seed values and a mapping of respective characteristics, which can be associated with sample timing paths, to respective numbers (e.g., random numbers), wherein the random numbers can be generated by the DMC (e.g., by a random number generator of or associated with the DMC), and the mapping can be created by the DMC.

The DMC, employing a simulator component, can apply simulated input to the sample timing paths (e.g., timing path information representative of the sample timing paths, including the respective characteristics of the sample timing paths) to generate simulated responses of the sample timing paths to the simulated input to generate simulation data that can represent the responses of the sample timing paths to the simulated input, wherein such simulation performed on the sample timing paths can simulate respective timing path properties and operating conditions (e.g., PVT or corner conditions) of the respective sample timing paths. The simulation performed by the simulator component can be or can comprise, for example, a spice-based simulation and simulation based labeling of the respective sample timing paths based at least in part on the respective items of timing path information of the respective sample timing paths and the simulation input, to facilitate generating the labeled training dataset that can be representative of the sample timing paths.

The DMC can process (e.g., abstract, and/or filter, . . . ) the simulation data to produce processed simulation data. The DMC can employ labeled data vectorization to determine and generate vectorized data based at least in part on the processed simulation data, which can represent the respective simulated responses of the respective sample timing paths, and can simulate the respective timing path properties and operating conditions of the respective sample timing paths. In some embodiments, the DMC can normalize the vectorized data, for example, to suppress (e.g., modify vectorized data to suppress) or remove any items of vectorized data that are determined by the DMC to be outlier data relative to other items of vectorized data.

The DMC can utilize the vectorized data (e.g., normalized vectorized data) as the training dataset to train a trained model that can represent the timing path properties and operating conditions of the set of sample timing paths, wherein the trained model can be utilized for timing path predictions. The DMC also can evaluate the training dataset to assess the quality of the training dataset and facilitate identifying any issues that may exist in the training dataset, and can determine improvements that can be made to the training dataset, as more fully described herein.

The DMC can determine the trained model, which can represent the timing path properties and operating conditions of the set of sample timing paths based at least in part on an analysis of the vectorized data associated with the set of sample timing paths. In accordance with various embodiments, to facilitate determining and/or training the trained model, the DMC can perform a defined analysis on the vectorized data using a desired training algorithm, which can relate to statistical regression analysis, neural networks, or other desired machine learning techniques, as more fully described herein.

In certain embodiments, the disclosed subject matter can comprise a static timing analysis (STA) component that can perform STA on design information associated with the integrated circuitry design, and can determine an operating condition of a timing path of the integrated circuitry design based at least in part on the results of the STA performed on the design information. The DMC (e.g., employing a predictor component) can predict or determine at least one other operating condition associated with the integrated circuitry design based at least in part on the operating condition of the timing path of the integrated circuitry design and the trained model, which can represent the timing path properties and the operating conditions of the set of sample timing paths.

In some embodiments, the DMC also can analyze the training dataset to determine the quality of the training dataset, including identifying any issues (e.g., sparsity or spatial discontinuity, and/or missing data) that may exist in the training dataset, which can cause undesirable (e.g., unnecessary) extrapolation during training of the trained model that can lead to reduced accuracy of the training model. Based at least in part on the results of such analysis, the DMC can facilitate enhancing (e.g., improving) generation and precision of training datasets through density consistency and/or localized datapoint generation. For instance, based at least in part on the analysis results, the DMC can determine modifications that can be made to the generation of the sample timing paths and/or the training dataset that can be produced therefrom, and can pass (e.g., feedback) such modifications to the automatic timing path generation process to facilitate enhancing the determination and generation of sample timing paths, and, as a result, enhancing the generation of training datasets and the training of the trained model.

The quality of the training dataset also may be affected by the STA results of the STA performed on the design information. In certain embodiments, the DMC can evaluate the training dataset associated with the sample timing paths in relation to the STA results generated from the STA performed on the design information to facilitate determining whether the automated timing path process is to be modified to enhance (e.g., improve) the training dataset. The DMC can process (e.g., modify or convert) the STA results to vectorize the STA results to generate vectorized STA data (e.g., STA results in a standardized vector dataset format). The DMC can analyze the vectorized STA data of the STA results to determine whether it is desirable for the STA data to have higher spatial local density in certain areas of the STA dataset, for example, due to certain characteristics of features of the integrated circuitry design. Such analysis of the vectorized STA data can be performed by the DMC in relation to the vectorized data of the training dataset (e.g., in relation to the respective local densities of respective areas of the vectorized data of the training dataset). In the DMC determines that it is desirable to have higher spatial local density in certain areas of the STA dataset, the DMC can generate information (e.g., feedback and/or modification information) that can indicate that it is desirable to have higher spatial local density in certain areas of the STA dataset and can provide such information to the automatic timing path generation process for use in the automatic timing path generation process (e.g., to modify the automatic timing path generation process) to enhance the generation of sample timing paths (e.g., enhance spice path generation). Additionally or alternatively, the DMC can modify the STA dataset based at least in part on such information (e.g., feedback and/or modification information) so that the STA dataset can have such higher spatial local density in those certain areas of the STA dataset.

These and other aspects and implementations of the disclosed subject matter will now be described in connection with the figures.

FIG. 1 illustrates a block diagram of an example, non-limiting system 100 that can efficiently enhance a design of an integrated circuit by employing multi-operating condition frequency prediction for statically timed designs through spice-based timing path labeling and statistical analysis, in accordance with various aspects and embodiments of the disclosed subject matter. The system 100 and techniques disclosed herein can be employed, for example, with very-large-scale integration (VLSI) processes to efficiently design and create integrated circuits.

The system 100 can comprise a design management component (DMC) 102 that can be employed to perform design enhancement (e.g., improvement or optimization) to facilitate improving the design of an integrated circuit, which can comprise cells and timing paths, in accordance with various aspects and embodiments of the disclosed subject matter. For instance, the DMC 102 can employ various techniques for multi-operating condition frequency prediction for statically timed designs through spice-based timing path labeling and statistical analysis (e.g., statistical regression analysis or other desired machine learning analysis and techniques) to enhance designing of integrated circuits.

In some embodiments, the DMC 102 can create a labeled training dataset, comprising vectorized data associated with (e.g., representative of) sample timing paths, that can be utilized for desirably accurate multi-operating condition (e.g., multi-process-voltage-temperature (multi-PVT) condition) frequency prediction, wherein the training dataset can be independent of the design data of an integrated circuit design, or portion thereof, that is under design or consideration, as more fully described herein. The DMC 102 also can employ analysis techniques and methods that can enhance (e.g., improve, optimize) the quality of the labeled training dataset by identifying holes (e.g., sparsity, spatial discontinuity, or missing data, . . . ) in the corresponding training dataset. For instance, the DMC 102 can analyze the quality of the training dataset to identify any sparsity that may exist in the training dataset, and can improve the precision of the training dataset through density consistency and/or localized datapoint generation to mitigate (e.g., reduce, minimize, or eliminate) any undesired sparsity that may exist in the training dataset, as more fully described herein.

In connection with designing an integrated circuit, various types of cells can be employed to perform various functions of the integrated circuit, wherein respective cells and respective timing paths can have respective characteristics (e.g., physical or logical characteristics (e.g., properties or attributes)). A cell(s) can be, can comprise, or can be part of electronic elements of an integrated circuit, wherein the electronic elements can comprise, for example, logic gates (e.g., AND gate, NAND gate, OR gate, NOR gate, XOR gate, XNOR gate, inverter gate, AND-OR-Invert gate, or other type of gate), multiplexer (MUX), demultiplexer (DEMUX), an adder component, a storage element (e.g., a flip-flop or latch element), etc. There also can be different types (e.g., variations) of a particular type of logic gate (e.g., a NAND gate can be a NAND-2 gate, which can have two inputs, or a NAND-3 gate which can have three inputs, . . . ). The logic gates can have various types of logic functions and attributes, such as, for example: 1 stack; 2 stack; 3 stack; 4 stack; 2 stage gate, with 1 front; 2 stage gate, with 2 fronts; 2 stage gate, with both stages being an inverter; 2 stage gate, with the first stage being 2-stack and the second stage being an inverter (e.g., clock gater clock-to-out time (tcq) can be included in this); 3 stage flip-flop (clock-to-out time (tcq)); 4 stage flip-flop (tcq); flip-flop setup attribute (e.g., input setup time (tsu)); flip-flop threshold attribute (e.g., input hold time (thold)); clock-gater/latch (tsu); and/or clock-gater/latch threshold (thold).

Also, the cells and/or logic gates can have respective voltage threshold (VT) characteristics, such as, for example, standard voltage threshold (SVT), low voltage threshold (LVT), or ultra-low voltage threshold (ULVT). Further, the cells and/or logic gates can have respective channel length characteristics, such as, for example, a channel length of 8 nanometers (nm), a channel length of 11 nm, or another desired channel length. Also, various types of technologies (e.g., metal-oxide-semiconductor field-effect transistor (MOSFET) (also known as metal-oxide-silicon (MOS) transistor), complementary metal-oxide-semiconductor (CMOS), low voltage CMOS (LVCMOS), p-type MOS (PMOS), n-type MOS (NMOS), or fin field-effect transistor (finFET), . . . ) can be employed with regard to the cells and/or logic gates.

The DMC 102 can comprise a timing path generator component 104 that can determine and generate (e.g., automatically determine and generate), in a randomized manner, a set of sample timing paths (e.g., set of agnostic, generic, or exemplary timing paths) based at least in part on respective characteristics that can be associated with respective sample timing paths of the set of timing paths, in accordance with the defined design management criteria. The timing path generator component 104 can determine and generate the sample timing paths independent of the design data of an integrated circuit design, or portion thereof, that is under design or consideration. In some embodiments, the timing path generator component 104 can determine the respective characteristics associated with the respective sample timing paths (e.g., characteristics, attributes, properties, and/or parameter values of logic gates, components, or wires, . . . , of sample timing paths) based at least in part on respective random seed values (e.g., random or pseudo-random numbers) and a mapping of respective characteristics associated with timing paths to respective numbers (e.g., random or pseudo-random numbers).

For instance, the DMC 102 (e.g., employing a mapper component) can determine and generate the mapping of respective characteristics, which can be associated with respective sample timing paths, to respective numbers (e.g., corresponding to random seed values). The DMC 102 (e.g., employing a random number generator component) can generate the random seed values (e.g., a random gate logic seed number, a random cell VT seed number, a random channel length seed number, or a random wire property seed number). With regard to a particular random seed number generated for a particular timing path-related characteristic (e.g., gate logic, cell VT, channel length, or wire property), the timing path generator component 104 can reference the random seed number in the mapping of respective timing path-related characteristics to respective numbers to identify or locate the number in the mapping that matches the random seed number and thereby determine the timing path-related characteristic(s) associated with (e.g., mapped or linked to) the number in the mapping.

The sample timing paths can comprise the types of timing paths that can be expected to be implemented in an integrated circuit design and/or other types of timing paths that may be less likely to be used in an integrated circuit design. For instance, with regard to the types of timing paths that can be expected to be implemented in an integrated circuit design, the sample timing paths can be the types of timing paths that can be expected to be associated with electronic elements (e.g., electronic elements or other integrated circuit components, such as logic gates) in an integrated circuit design. Timing paths can have a starting point and an end point(s) that typically can be associated with respective electronic elements (e.g., respective ports or pins of respective electronic elements) of the integrated circuit design. An integrated circuit design can comprise various types of timing paths, such as, for example, data paths, clock paths, clock gating paths, or asynchronous paths, or other desired types of timing paths.

The DMC 102 also can receive design information associated with (e.g., relating to, representative of) integrated circuitry of an integrated circuit design, or portion thereof, that can be under consideration or design. In some embodiments, initially, the design information received by the DMC 102 (e.g., in an early stage of the designing of the integrated circuit) can comprise design information associated with a timing path of the integrated circuit design (or preliminary or draft design of the integrated circuit), or a relatively small number of timing paths of the integrated circuit design. As more fully described herein, in certain embodiments, the DMC 102 also can receive design information (e.g., other design information) associated with other timing paths of the integrated circuit design at a desired time(s) during the design of the integrated circuit. The DMC 102 can receive the design information from a desired source, such as, for example, a user (e.g., via the user interface) or a component or device (not shown in FIG. 1) associated with the DMC 102.

The DMC 102 can determine, generate (e.g., create), or train a trained model 106 that can represent (e.g., model) timing path properties and operating conditions of the set of sample timing paths based at least in part on an analysis of vectorized data. The DMC 102 can determine the vectorized data based at least in part on (e.g., relate to or represent) the respective timing path information (e.g., respective items of timing path information) associated with the respective sample timing paths of the set of sample timing paths, wherein the respective timing path information can relate to the respective characteristics (e.g., respective gate logic functions, respective cell VTs, respective channel lengths, and/or respective wire properties, . . . ) associated with the respective sample timing paths, as more fully described herein. The DMC 102 can perform various processes (e.g., simulation process on the timing path information; abstraction process, filtering process, and vectorization process on simulation data produced from the simulation process; and/or normalization process on the vectorized data; . . . ) to facilitate determining, generating, or training the trained model 106, in accordance with the defined design management criteria, as more fully described herein. The DMC 102 can store the trained model 106, including the model data representative of the trained model 106, in a trained database 108.

The DMC 102 can determine, generate, or train the trained model 106 and/or the trained database 108, or respective versions of the trained model and/or trained database, prior to an initial design of an integrated circuit design, or portion thereof (e.g., a timing path(s) of the integrated circuit design), or in conjunction with the initial design of the integrated circuit design, or portion thereof, as more fully described herein. The DMC 102 also can update (e.g., update the training of) the trained model 106 and/or trained database 108 during the analysis and design of the integrated circuit design or subsequent to the design of the integrated circuit design, as desired, as more fully described herein.

The DMC 102 (e.g., employing an STA component (not shown in FIG. 1)) can perform an STA on the design information associated with the integrated circuit design (e.g., the design information relating to the timing path of the integrated circuit design). At least initially, the DMC 102 can determine, for example, an operating condition of the timing path of the integrated circuit design based at least in part on the results of the STA. In some embodiments, as desired, initially, the DMC 102 can determine one or more operating conditions of one or more timing paths of the integrated circuit design based at least in part on the results of the STA. For example, if and as desired, instead of initially determining only one operating condition of one timing path of the integrated circuit design from the STA results, the DMC 102 can initially determine more than one operating condition (e.g., two or more operating conditions) of the timing path of the integrated circuit design, or can initially determine a desired number of operating conditions (e.g., one or more operating conditions) for each of two or more timing paths of the integrated circuit design, based at least in part on the STA results.

From the operating condition(s) of the timing path(s) of the integrated circuit design determined (e.g., initially determined) based at least in part on the STA results, the DMC 102 also can determine one or more other operating conditions associated with the integrated circuit design based at least in part on the operating condition(s) of the timing path(s) of the integrated circuit design and the trained model 106 that can represent the timing path properties and the operating conditions associated with the set of sample timing paths, in accordance with the defined design management criteria, as more fully described herein. For instance, to facilitate determining the one or more other operating conditions associated with the integrated circuit design, the DMC 102 can vectorize the analysis timing path data (e.g., STA timing path data) associated with the timing path of the integrated circuit design to generate vectorized input data, as more fully described herein.

The DMC 102 can comprise a predictor component 110 that can receive the vectorized input data associated with the timing path(s) of the integrated circuit design, and also can receive certain vectorized data associated with the set of sample timing paths from the trained model 106 of the trained database 108. The predictor component 110 can analyze the vectorized input data and the vectorized data. Based at least in part on the results of the analysis of the vectorized input data and the vectorized data, the predictor component 110 can predict the one or more other operating conditions associated with the integrated circuit design, in accordance with the defined design management criteria. The DMC 102 can determine the one or more other operating conditions associated with the integrated circuit design, based at least in part on the prediction of the one or more other operating conditions associated with the integrated circuit design made by the predictor component 110, in accordance with the defined design management criteria. The DMC 102 can output information regarding the one or more other operating conditions associated with the integrated circuit design (e.g., determined or predicted design analysis results relating to the integrated circuit design), wherein the DMC 102, another component or device, and/or a user can use such output information regarding the one or more other operating conditions to design the integrated circuit, further design the integrated circuit, or modify the design of the integrated circuit.

Figure 2:
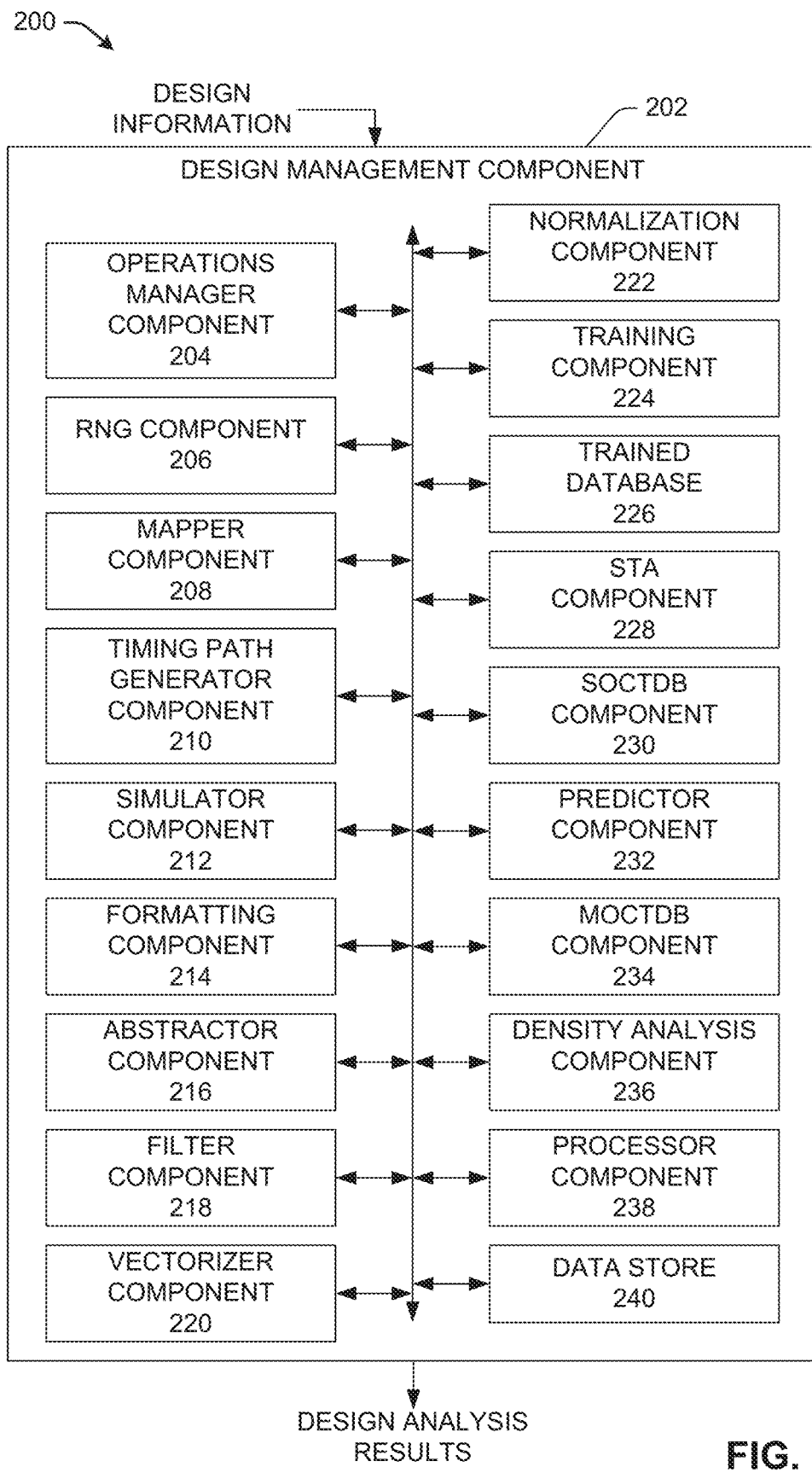
FIG. 2 depicts a block diagram of another example, non-limiting system that can efficiently enhance a design of an integrated circuit by employing multi-operating condition frequency prediction for statically timed designs through spice-based timing path labeling and statistical analysis, in accordance with various aspects and embodiments of the disclosed subject matter.

Referring to FIG. 2, FIG. 2 depicts a block diagram of another example, non-limiting system 200 that can efficiently enhance a design of an integrated circuit by employing multi-operating condition frequency prediction for statically timed designs through spice-based timing path labeling and statistical analysis, in accordance with various aspects and embodiments of the disclosed subject matter. The system 200 and techniques disclosed herein can be employed, for example, with VLSI processes to efficiently design and create integrated circuits.

The system 200 can comprise a DMC 202 that can efficiently manage the design of integrated circuit, including determining a desirable design of an integrated circuit, enhancements that can be made to an integrated circuit design, and/or determining operating conditions and properties associated with timing paths of an integrated circuit design, etc. The DMC 202 can comprise, for example, an operations manager component 204, a random number generator (RNG) component 206, a mapper component 208, a timing path generator component 210, a simulator component 212, a formatting component 214, an abstractor component 216, a filter component 218, a vectorizer component 220, a normalization component 222, a training component 224, a trained database 226, an STA component 228, a single operating condition timing database (SOCTDB) component 230, a predictor component 232, a multi-operating condition timing database (MOCTDB) component 234, a density analysis component 236, a processor component 238, and a data store 240.

The operations manager component 204 can control or manage operations and/or algorithms being performed by various components of the DMC 202, controlling data flow between various components of the DMC 202, and/or controlling data flow between the DMC 202 and other components or devices (e.g., design database, communication network component, . . . ) associated with (e.g., connected to) the DMC 202, etc.

Figure 3:
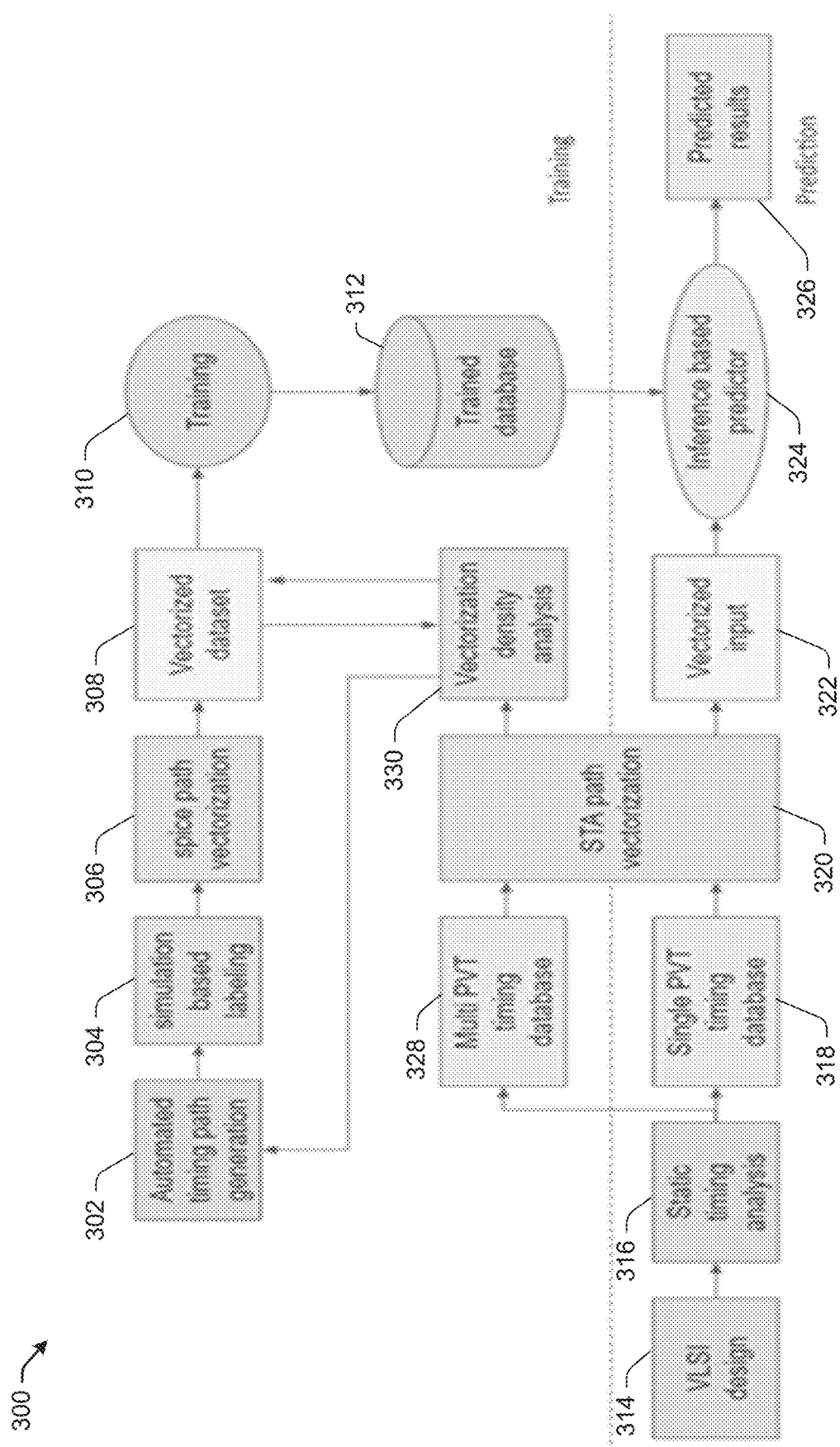
FIG. 3 presents a block diagram of an example timing path determination process flow that can be performed to determine or predict operating conditions of timing paths of an integrated circuit design, in accordance with various aspects and embodiments of the disclosed subject matter.

Referring to FIG. 3 (along with FIG. 2), FIG. 3 presents a block diagram of an example timing path determination process flow 300 that can be performed to determine or predict operating conditions of timing paths of an integrated circuit design, in accordance with various aspects and embodiments of the disclosed subject matter. The DMC 202 can perform automated timing path generation to facilitate determining or generating respective sample timing paths of the set of sample timing paths (as depicted at block 302 of the process flow 300 of FIG. 3). To facilitate performing automated timing path generation, the DMC 202 can employ the random number generator component 206 to generate random numbers (e.g., pseudo-random numbers or true random numbers) that can be utilized as random seed numbers to facilitate determining respective characteristics of the respective sample timing paths. The random number generator component 206 can be configured to generate random numbers that can be relevant to the timing path-related characteristic under consideration. For instance, if a particular timing path-related characteristic has four possible choices (e.g., parameter values, properties, or selections, . . . ), the random number generator component 206 can be configured to generate a random number that can have one of four different values (e.g., 1, 2, 3, or 4), if a particular timing path-related characteristic has five possible choices, the random number generator component 206 can be configured to generate a random number that can be one of five different values (e.g., 1, 2, 3, 4, or 5), and, if a particular timing path-related characteristic has six possible choices, the random number generator component 206 can be configured to generate a random number that can be one of six different values (e.g., 1, 2, 3, 4, 5, or 6), etc. For example, with regard to the characteristic of cell VT, there can be three different types of cell VT, comprising SVT, LVT, and ULVT, and accordingly, when generating a random number (e.g., a random cell VT seed number) for the cell VT characteristic, the random number generator component 206 can be configured to generate a random number that can be one of three different values (e.g., 1, 2, or 3).

The DMC 202 also can employ the mapper component 208 to determine and generate a mapping of the respective characteristics, which can be associated with the respective sample timing paths, to respective numbers (e.g., random seed numbers), in accordance with the defined design management criteria. For instance, the mapper component 208 can generate a mapping that can map (e.g., link or associate) respective numbers of a first set of numbers to a number of gates and wires a sample timing path can have; can map respective numbers of a second set of numbers to respective gate logic characteristics of a gate of a sample timing path; can map respective numbers of a third set of numbers to respective cell VT characteristics of a gate of a sample timing path; can map respective numbers of a fourth set of numbers to respective channel length characteristics of a gate of a sample timing path; can map respective numbers of a fifth set of numbers to respective wire characteristics of a wire associated with a gate of a sample timing path; etc.

The timing path generator component 210 can determine and generate (e.g., automatically determine and generate) respective items of timing path information, including, for example, respective characteristics, relating to respective sample timing paths of a set of sample timing paths (e.g., agnostic, generic, or exemplary timing paths) based at least in part on the random seed numbers and the mapping of the respective timing path-related characteristics to respective numbers. In certain embodiments, the time path generator component 210 also can determine items of timing path information based at least in part on information (e.g., timing path-related information) received from a desired source, such as, for example, a user (e.g., via a user interface associated with the DMC 202) or a component or device (not shown in FIG. 2) associated with (e.g., communicatively connected to) the DMC 202. For instance, the timing path generator component 210 can determine and/or generate a sample timing path(s) based at least in part on the results of analyzing the information received from the desired source.

Figure 4:
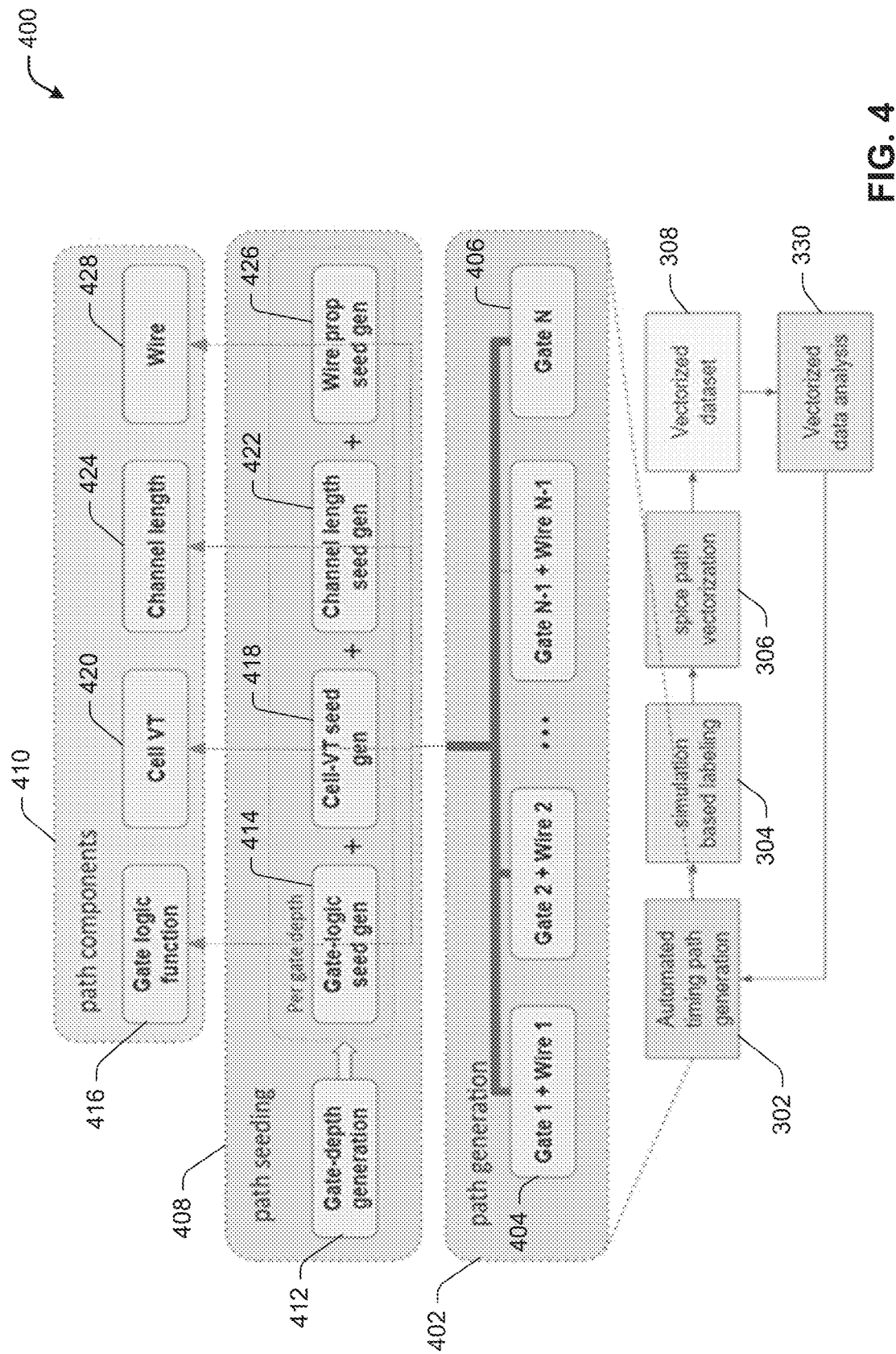
FIG. 4 depicts a block diagram of an example timing path determination process flow that can be performed to determine and generate sample timing paths, in accordance with various aspects and embodiments of the disclosed subject matter.

Referring to FIG. 4 (along with FIGS. 2 and 3), FIG. 4 depicts a block diagram of an example timing path determination process flow 400 that can be performed to determine and generate sample timing paths, in accordance with various aspects and embodiments of the disclosed subject matter. The timing path generator component 210 determine (e.g., automatically determine) the number of sample timing paths to be created (e.g., using the random number generator component 206), or can receive information, from a desired source (e.g., user), that can indicate the number of sample timing paths to be created. The number of sample timing paths can be virtually any desired number, such as, for example, 1,000, 10,000, 100,000, or 1,000,000 sample timing paths, or virtually any other desired number of sample timing paths greater than or less than 1,000,000.

As part of timing path generation, for each sample timing path of the set of sample timing paths, the timing path generator component 210 can determine a number of gates and a corresponding number of wires of the sample timing path based at least in part on a random number (e.g., random gate seed number generated) and/or the mapping (as indicated at reference numeral 402). For instance, for each sample timing path, the random number generator component 206 can generate a random number, which can be N or another number that can be mapped to N in the mapping, and the timing path generator component 210 can determine that there can be N gates and associated wires (e.g., N−1 wires), including gate 1 and associated wire 1 (as depicted at reference numeral 404) up through gate N (as depicted at reference numeral 406) in the sample timing path, wherein N can be virtually any desired number (e.g., 10, 20, 30, . . . , 100, or any other desired number greater than or less than 100).

For each sample timing path, the timing path generator component 210 can perform path seeding to facilitate determining the respective path components, including the respective elements of each of the respective components, of each of the gates of each of the sample timing paths (as indicated at reference numeral 408 and reference numeral 410). As part of the path seeding, the timing path generator component 210 can perform gate-depth generation to seed respective elements associated with each gate of each sample timing path on a per-gate basis (as depicted at reference numeral 412). For each gate of each sample timing path, the random number generator component 206 can generate a random gate logic seed number, and the timing path generator component 210 can perform gate logic seed generation 414 (gate logic seed gen) to determine the gate logic function 416 of the gate based at least in part on the random gate logic seed number and the mapping. For example, with regard to a gate, if the random number is a first random gate logic seed number (e.g., 1), the timing path generator component 210 can reference the mapping and can determine a first gate logic (e.g., NAND-2 gate logic and/or other gate logic-related characteristics of the gate) associated with the first random gate logic seed number in the mapping; if the random number is a second random gate logic seed number (e.g., 2), the timing path generator component 210 can reference the mapping and can determine a second gate logic (e.g., NOR gate logic and/or other gate logic-related characteristics of the gate) associated with the second random gate logic seed number in the mapping; or, if the random number is a third random gate logic seed number (e.g., 3), the timing path generator component 210 can reference the mapping and can determine a third gate logic (e.g., inverter gate logic and/or other gate logic-related characteristics of the gate) associated with the third random gate logic seed number in the mapping; etc. The other gate-logic related characteristics can comprise, for example, a stack attribute, a stage attribute, a flip-flop attribute, and/or other characteristics of a gate.

Also, for each gate of each sample timing path, the random number generator component 206 can generate a random cell VT seed number, and the timing path generator component 210 can perform cell VT seed generation 418 (cell VT seed gen) to determine the cell VT 420 associated with the gate based at least in part on the random cell VT seed number and the mapping. For example, with regard to a gate, if the random number is a first random cell VT seed number, the timing path generator component 210 can reference the mapping and can determine a first cell VT (e.g., SVT) associated with the first random cell VT seed number in the mapping; if the random number is a second random cell VT seed number, the timing path generator component 210 can reference the mapping and can determine a second cell VT (e.g., LVT) associated with the second random cell VT seed number in the mapping; or, if the random number is a third random cell VT seed number, the timing path generator component 210 can reference the mapping and can determine a third cell VT (e.g., ULVT) associated with the third random gate logic seed number in the mapping.

For each gate of each sample timing path, the random number generator component 206 can generate a random channel length seed number, and the timing path generator component 210 can perform channel length seed generation 422 (channel length seed gen) to determine the channel length 424 associated with the gate based at least in part on the random channel length seed number and the mapping (as indicated at reference numeral 416). For instance, with regard to a gate, if the random number is a first random channel length seed number, the timing path generator component 210 can reference the mapping and can determine a first channel length (e.g., 8 nm) associated with the first random channel length seed number in the mapping, or, if the random number is a second random channel length seed number, the timing path generator component 210 can reference the mapping and can determine a second channel length (e.g., 11 nm) associated with the second random channel length seed number in the mapping.

For each wire associated with each gate of each sample timing path, the random number generator component 206 can generate a random wire property seed number, and the timing path generator component 210 can perform wire property seed generation 426 (wire prop seed gen) to determine a wire property of a wire 428 associated with the gate based at least in part on the random wire property seed number and the mapping (as indicated at reference numeral 418). For instance, with regard to a gate, if the random number is a first random wire property seed number, the timing path generator component 210 can reference the mapping and can determine a first wire property (e.g., a first wire width, a first wire material, a first wire resistance or other first wire parasitic value, or another type of first wire property) associated with the first random wire property seed number in the mapping, or, if the random number is a second random wire property seed number, the timing path generator component 210 can reference the mapping and can determine a second wire property (e.g., a second wire width, a second wire material, a second wire resistance or other second wire parasitic value, or another type of second wire property) associated with the second random wire property seed number in the mapping, etc.

The timing path generator component 210 can produce respective timing path information relating to the respective sample timing paths as an output. For instance, the timing path generator component 210 can generate first timing path information relating to a first sample timing path of the set of sample timing paths, wherein the first timing path information can comprise respective items of first timing path information relating to the respective first characteristics (e.g., gate logic function, cell VT, channel length, wire properties, and/or other characteristics, for or associated with each gate) of or associated with the first sample timing path; and second timing path information relating to a second sample timing path of the set of sample timing paths, wherein the second timing path information can comprise respective items of second timing path information relating to the respective second characteristics of or associated with the second sample timing path; etc.

The simulator component 212 of the DMC 202 can perform a simulation based labeling process to facilitate simulating operation of the respective sample timing paths (as depicted at block 304 of the process flow 300). The simulator component 212 can analyze the respective sample timing paths and/or the respective items of timing path information associated with the respective sample timing paths. Based at least in part on the results of the analysis, the simulator component 212 can simulate the respective sample timing paths (e.g., simulate the operation, performance, and/or reactions or responses of the respective sample timing paths) to generate respective items of simulation data that can be associated with (e.g., can represent, correspond to, be indicative of) the simulation of the respective timing path properties and the respective operating conditions (e.g., PVT conditions, latencies, throughput conditions, and/or parasitic conditions, . . . ) associated with the respective sample timing paths. In some embodiments, the simulation performed by the simulator component 212 can be or can comprise, for example, a spice-based simulation of the respective sample timing paths based at least in part on the respective items of timing path information.

Figure 5:
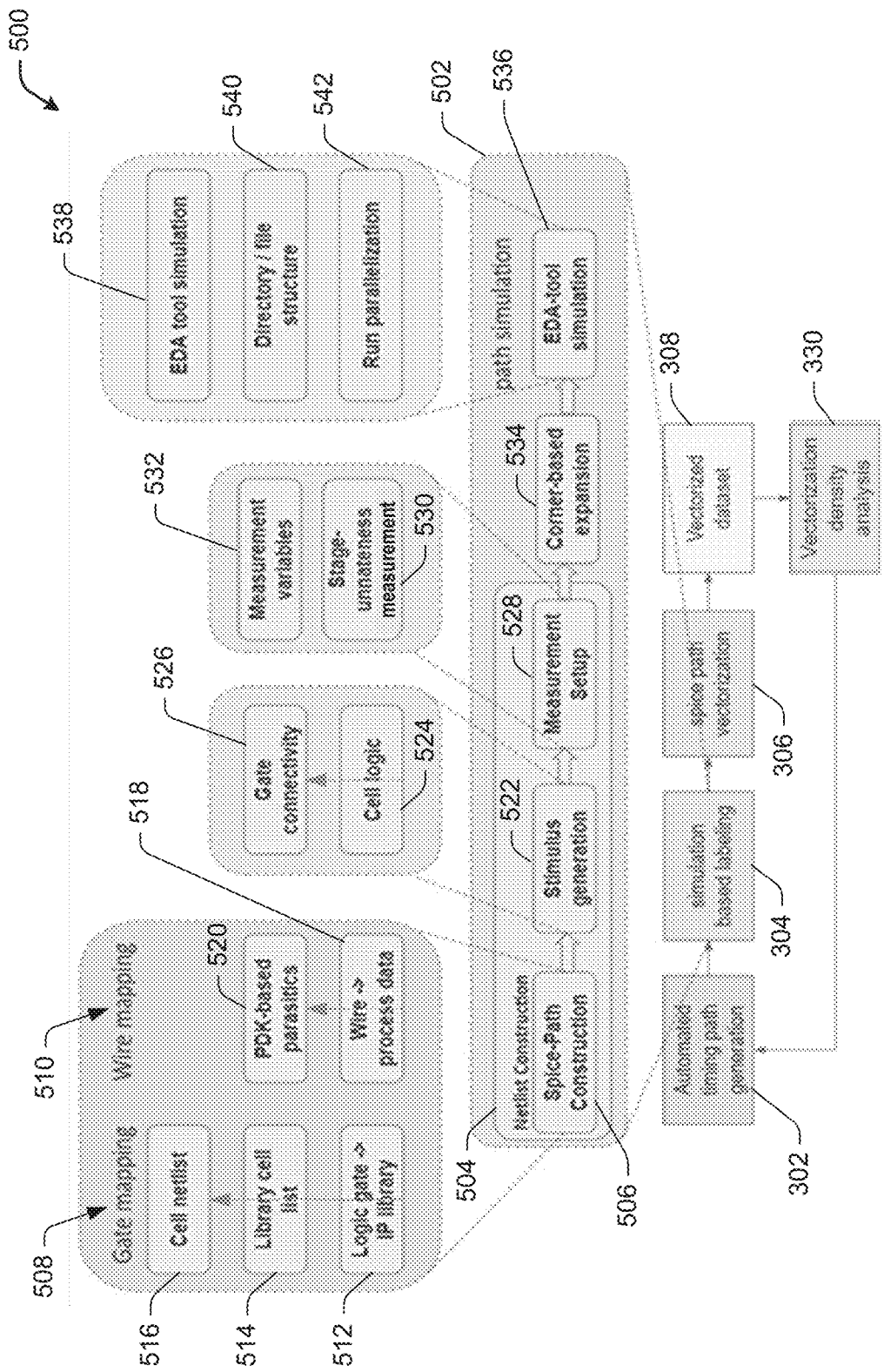
FIG. 5 illustrates a block diagram of an example timing path construction and simulation process for sample timing paths, in accordance with various aspects and embodiments of the disclosed subject matter.

Turning to FIG. 5 (along with FIGS. 2 and 3), FIG. 5 illustrates a block diagram of an example timing path construction and simulation process 500 for sample timing paths, in accordance with various aspects and embodiments of the disclosed subject matter. The example timing path construction and simulation process 500 can comprise the simulator component 212, which can perform path simulation 502 on each sample timing path of the set of sample timing paths to simulate the respective operations and responses of the respective sample timing paths.

As part of the path simulation 502, the simulator component 212 can perform netlist construction 504 for each sample timing path of the set of sample timing paths. The netlist construction 504 can consider the component and the stimulus (e.g., for each sample timing path, or portion thereof), and can construct the appropriate measurements that can properly label each sample timing path, or portion thereof (e.g., logic gates or other elements or components of a sample timing path), of the set of timing paths. The simulator component 212 can generate or construct respective netlists for respective sample timing paths based at least in part on the respective components, elements, circuitry, and/or characteristics of or associated with the respective sample timing paths.

In some embodiments, as part of the netlist construction 504, the simulator component 212 can perform a spice-path construction 506 for each of the respective sample timing paths. As part of the spice-path construction 506, for each sample timing path of the set, the simulator component 212 can perform gate mapping 508 of the logic gates of the sample timing path and wire mapping 510 of the wires associated with the logic gates of the sample timing path to prepare the sample timing path for simulation of the characteristics, including the corner-based parasitics, of the sample timing path. When performing the gate mapping 508 of the logic gates and the wire mapping 510 of the wires, the simulator component 212 can take in process technology specific mapped components associated with the sample timing path and can standardize the instantiation of such components.

With regard to gate mapping 508, for each sample timing path, the simulator component 212 can generate (e.g., create) an IP library 512 for the logic gates of the sample timing path based at least in part on the respective characteristics of or associated with the respective logic gates of the sample timing path. For each sample timing path, the simulator component 212 also can determine or generate a library cell list 514 for the sample timing path based at least in part on the IP library 512 associated with the sample timing path. Also, for each sample timing path, the simulator component 212 can determine or generate a cell netlist 516 (e.g., spice cell netlist) of the cells and associated logic gates of the sample timing path, based at least in part on the library cell list 514, wherein the cell netlist 516 can characterize or represent the logic function and/or type of logic employed by the each of the cells and associated gates of the sample timing path, can define node connections between respective elements (e.g., transistors) of the cells and associated gates, and/or can define or represent respective characteristics, including parasitic characteristics or conditions (e.g., corner-based parasitic characteristics or conditions), of the respective cells and associated logic gates of the sample timing path.

With regard to wire mapping 510, for each wire associated with a logic gate of a sample timing path, the simulator component 212 can determine or generate process data 518 relating to the characteristics of the wire based at least in part on the results of analyzing the items of timing path information relating to such wire. Also, for each wire of the sample timing path, the simulator component 212 can determine the parasitics (e.g., resistance, capacitance, inductance, impedance), such as, for example, the process design kit (PDK)-based parasitics 520, of or associated with the wire based at least in part on the process data associated with such wire.

The simulator component 212 can perform stimulus generation 522 to provide or apply respective stimulus (e.g., respective input signals or values) to respective inputs of the sample timing paths constructed through the spice-path construction 506. The simulator component 212, when performing the stimulus generation 522, can take logic descriptions of a design of a sample time path, can analyze the relationship of cell specific pins being modeled by the simulation, and can create an effective stimulus (e.g., stimulus signal) at each stage of the sample timing path starting at the root. Different logic gates of a sample timing path can have different inputs, depending on the type of logic gate. For each logic gate, there can be an input(s) that can be part of the sample timing path and/or there also can be one or more inputs that are not part of the sample timing path. In order to desirably (e.g., properly or suitably) simulate the operation and response of a sample timing path, for each logic gate of each sample timing path, as part of performing the stimulus generation 522, the simulator component 212 can determine the cell logic 524 of the logic gate based at least in part on the results of analyzing the logic gate. For each logic gate of each sample timing path, the simulator component 212 also can determine the gate connectivity 526 of the logic gate based at least in part on the cell logic 524 determined for the logic gate and the analysis results, wherein determining the gate connectivity 526 can include determining what input(s) (e.g., input port(s)) the logic gate has, determining which input(s) of the logic gate is part of the sample timing path and which input(s) of the logic gate is not part of the sample timing path, and/or what stimulus (e.g., what input signal or value) is to be applied to the input(s) that is not part of the sample timing path during simulation of the sample timing path.

For example, if a sample timing path includes a two-input AND gate, the first input to the gate can be part of the sample timing path, and the second input to the gate is not part of the sample timing path. To perform simulation of the operation and response of this AND gate, the simulator component 212 will have to provide a stimulus (e.g., an input signal or value) to the second input, while simulating the operation of the first input (e.g., by applying an input signal to the first input). The simulator component 212 can analyze the AND gate, can determine the cell logic of the AND gate, based at least in part on the results of such analysis, and can determine the gate connectivity for the AND gate, based at least in part on the cell logic of the gate and the results of such analysis. For instance, based at least in part on the analysis results, the simulator component 212 can determine that the cell logic is AND logic, and the AND gate has two inputs, with the first input being part of the sample timing path and the second input not being part of the timing path. Accordingly, the simulator component 212 also can determine that, during simulation of the operation and response of the AND gate, a stimulus, the stimulus being an input signal having a value of 1 (e.g., a high signal), is to be applied to the second input of the AND gate during simulation of the AND gate. This can be because, for an AND gate, if a 0 value is applied to the second input of the gate, the output of the AND gate will always be 0, regardless of what the input signal to the first input is, but, if a 1 value is applied to the second input of the gate, the output of the AND gate can vary depending on what input signal is applied to the first input of the gate.

In some embodiments, the simulator component 212 perform measurement setup 528 to measure desired and various properties associated with each sample timing path of the set of sample timing paths to facilitate vectorizing the measurement information relating to the measurements of such properties. For each sample timing path, as part of performing the measurement setup 528, the simulator component 212 can perform stage-unateness measurements 530, and can determine the measurement variables 532 (e.g., measurement variables that can be desired) to be measured during simulation of the sample timing path, including each of the gates and wires, and can perform the measurements of the desired variables 532 associated with the sample timing path.

For example, if it is desired to measure the gate delay of a logic gate and a wire delay of a wire of a sample timing path for each one of the stages, as part of the measurement setup 528, the simulator component 212 can determine the measurement setup 528, and implement it, so that the simulator component 212 measures not only from the first input of the first logic gate of the sample timing path to the final output of the sample timing path, but also can measure the gate delay for each logic gate of the sample timing path, can measure the wire delay for each wire of the sample timing path, etc., through various (e.g., different) corners to see how the logic gates, wires, and corners respond to the simulation input data (e.g., simulation input signals).

With further regard to stage-unateness measurements 530, as an example, the stage-unateness can depend on the cell, wherein, for instance, for an inverter, the input and output can be inverted in terms of the logic polarities, such that, if there is a 0 signal on the input of the inverter, there can be a 1 signal at the output of the inverter, and, if you have a 1 signal on the input, there can be a 0 signal at the output of the inverter. In contrast, for a buffer, the logic can follow each other such that, if you have a 0 signal at the input of the buffer, you can have a 0 signal at the output of the buffer. As part of the stage-unateness measurements 530, the simulator component 212 can perform the measurements of the logic gates or other elements of the sample timing path to ensure that the measurements are set up in a way that can correspond to, and be suitable for, the logic of the logic gate or element under consideration so that the desired (e.g., proper or suitable) type of transition associated with such gate or element can be properly measured by the simulator component 212.

With the netlist construction 504 performed, for each sample timing path of the set, the simulator component 212 can perform corner-based expansion 534 to cover and simulate a desired number of corners, and desired types of corners, associated with the sample timing path to facilitate desired training of the trained database 226 and desired prediction of the desired corners by the predictor component 232. For example, if it is desired to be able to predict 20 particular corners associated with a timing path of an integrated circuit design, the simulator component 212 can perform corner-based expansion 534 to cover and simulate those 20 particular corners for the sample timing paths of the set of sample timing paths.

With the corner-based expansion 534 performed, the simulator component 212 can perform simulation of the respective sample timing paths of the set of sample timing paths, for example, utilizing an electronic design automation (EDA)-tool simulation 536 (or another desired type of simulation tool). The simulator component 212, when performing the EDA-tool simulation 536, can take each of the sample timing paths and use a transient domain matrix-solving integrated circuit simulation program to obtain the specified measurement labels for each of the sample timing paths, or portion thereof. As part of the EDA-tool simulation 536, the simulator component 212 can perform the simulation 538 (e.g., EDA tool simulation) of the respective sample timing paths, including the desired corners associated with the sample timing paths, based at least in part on the input files (e.g., spice input files) for each of the sample timing paths, as determined from the netlist construction 504 and corner-based expansion 534 performed for each of the sample timing paths. The simulator component 212 can perform the EDA tool simulation 538 to simulate the respective sample timing paths, based at least in part on (e.g., in accordance with) the desired directory and file structure 540, to facilitate performing desirable simulation of the respective sample timing paths and producing desirable (e.g., suitable or optimal) simulation results (e.g., simulation data) from the simulation of the respective sample timing paths.

In some embodiments, during simulation of the respective sample timing paths, the simulator component 212 can employ run parallelization 542 to perform (e.g., run) the simulation of a desired number of sample timing paths in parallel (e.g., simultaneously or substantially simultaneously) to facilitate expediting the simulation of the respective sample timing paths.

With further regard to FIGS. 2 and 3, in accordance with various embodiments, the DMC 202 can employ the formatting component 214, abstractor component 216, filter component 218, vectorizer component 220, and normalization component 222 to facilitate performing desired vectorization on the respective items of simulation data (as depicted at block 306 of the process flow 300), which can be produced as a result of the simulation of the respective sample timing paths, to generate a vectorized dataset (e.g., vectorized data) (as depicted at block 308 of the process flow 300), as more fully described herein. For instance, the formatting component 214 can format the respective items of simulation data into a desired format (e.g., database format) in a database to generate respective items of formatted simulation data. That is, the formatting component 214 can take the raw simulation results (e.g., items of simulation data) and parse such data into a desirable (e.g., suitable and/or relatively easy to digest) database (e.g., desired formatted database).

The abstractor component 216 can perform a desired abstraction process on the respective items of formatted simulation data to abstract the respective items of formatted simulation data associated with a higher number of unique timing path properties (e.g., 1,000,000 or other relatively higher number of unique timing path properties) to generate respective items of representative simulation data associated with a desired lower number of representative timing path properties associated with respective representative bins (e.g., 100 or other relatively lower number of representative timing path properties and associated representative bins), as more fully described herein. For instance, based at least in part on the supported logic families and technology associated with the integrated circuit design, the abstractor component 216 can abstract the gate based timing path properties from the relatively higher number of timing path properties into a relatively lower number of respective representative bins associated with respective representative timing path properties.

The filter component 218 can respectively filter, as desired, the respective items of representative simulation data, based at least in part on respective desired filters, to generate respective items of filtered data associated with the respective representative sample timing path properties (and associated representative bins), in accordance with the defined design management criteria relating to filtering of data. For example, the filter component 218 can respectively filter the respective items of representative simulation data (e.g., filter the values of such representative simulation data) to, with respect to particular items of representative simulation data associated with a particular representative bin, determine (e.g., calculate) the sum value of raw data values of such simulation data, determine the mean value of the raw data values, determine the mean plus N*sigma values of the raw data values, determine the average value of the raw data values, determine the root mean square value of the raw data values, filter out certain raw data values of certain items of the simulation data determined to be outlier data values, and/or perform other desired operations (e.g., mathematical operations) on the raw data values.

The vectorizer component 220 can perform a vectorization transformation on the filtered database in abstracted form so there can be deterministic fields for each representative bin, wherein each representative bin can be associated with one or more fields (e.g., a relatively low number of fields, as compared to the number of unique properties), as more fully described herein. For instance, based at least in part on the respective items of filtered data associated with the respective representative sample timing path properties (and associated representative bins), the vectorizer component 220 can vectorize (e.g., perform a vectorization transformation on) the respective items of filtered data to determine and generate respective items of the vectorized data that can represent the respective items of filtered data in a desired numeric form (e.g., as numeric vectors), wherein, with respect to each representative bin, respective items of vectorized data for such bin can be associated with respective fields of that representative bin.

In some embodiments, the normalization component 222 can normalize the respective items of vectorized data, in accordance with the defined design management criteria. For instance, the normalization component 222 can normalize the respective items of vectorized data to suppress (e.g., modify vectorized data to suppress) or remove any items of vectorized data that are determined by the normalization component 222 as outlier data relative to other items of vectorized data.

The training component 224 can utilize the items of vectorized data to perform training with regard to operating conditions and properties of sample timing paths to generate the trained database 226 (as indicated by blocks 310 and 312 of the process flow 300). For instance, the training component 224 can utilize the items of vectorized data to determine, generate (e.g., create), or train the trained database 226 based at least in part on a desired training algorithm and/or data analysis, in accordance with defined design management criteria relating to database training. The trained database 226 can be or can comprise a trained model that can model the sample timing paths, including modeling the respective properties and operating conditions of the sample timing paths. In some embodiments, to perform the training and generate the trained database 226, the training component 224 can utilize (e.g., apply) statistical regression analysis on a portion of the vectorized data (e.g., a training set) and validate the analysis results using another portion of the vectorized data (e.g., a validation set), as more fully described herein. In other embodiments, additionally or alternatively, the training component 224 can perform desired analysis on the items of vectorized data using one or more desired machine learning techniques and algorithms (e.g., neural network techniques and algorithms) to perform the training and generate the trained database 226. The trained database 226 can comprise numerical values (e.g., vectors comprising numeric values) relating to operating conditions and properties of sample timing paths that can be desirable (e.g., suitable, acceptable, or optimal) for use by the DMC 202 in inferring or determining operating conditions and properties of timing paths of the integrated circuit design.

With regard to an integrated circuit design, or portion thereof, the STA component 228 can receive design information of the integrated circuit design (e.g., VLSI design) from a user (e.g., via an interface) or a component or device associated with the DMC 202 (as indicated at block 314 of the process flow 300). The design information can comprise information regarding one or more timing paths of the integrated circuit design, including components associated with the timing paths, and one or more properties and one or more operating conditions associated with the one or more timing paths. The STA component 228 can perform an STA on the design information (as indicated at block 316 of the process flow 300). In some embodiments, at least initially (e.g., relatively early on in the designing of the integrated circuit), the STA component 228 can determine an operating condition and/or property associated with a timing path of the integrated circuit design based at least in part the analysis results of the STA performed on the design information. The STA component 228 can store the information regarding the operating condition and/or property associated with the timing path of the integrated circuit design in the single operating condition (e.g., single PVT) timing database 230 in the data store 240 (as indicated at block 318 of the process flow 300). In certain embodiments, at the initial stage, the STA component 228 can determine more than one operating condition and/or more than one property associated with more than one timing path of the integrated circuit design based at least in part the analysis results of the STA performed on the design information.

The vectorizer component 220 can perform a vectorization transformation (e.g., STA path vectorization) on the analysis timing path information (e.g., STA results regarding the timing path) to convert the analysis timing path information into vectorized input data that can be or can comprise a desired vector, which can include a desired number of vector fields, wherein the vector can represent the analysis timing path information in numeric form (as indicated at blocks 320 and 322 of the process flow 300). The vectorization transformation performed by the vectorizer component 220 on the analysis timing path information can be the same as or similar to the vectorization transformation performed on the filtered data that can be determined based at least in part on the sample timing paths.

The predictor component 232 can receive (e.g., retrieve or obtain) the vectorized input data associated with the timing path of the integrated circuit design and also can receive the trained model from the trained database 226, wherein the predictor component 232 can be or can comprise an inference based predictor function (as indicated at block 324 of the process flow 300). The trained model can comprise model data that can be based at least in part on the training performed using the vectorized data. In some embodiments, the model data can be in the form of a numeric vector. The predictor component 232 can analyze the model data of the trained model and the vectorized input data using desired inference techniques, prediction techniques, and/or machine learning techniques (e.g., machine learning techniques relating to inference and/or prediction) and associated algorithms. From the analysis, the predictor component 232 can infer or predict one or more other operating conditions and/or other properties of one or more timing paths of the integrated circuit design based at least in part on the vectorized input data relating to the operating condition of the timing path of the integrated circuit design and the model data of the trained model, which can be based at least in part on the vectorized data relating to the set of timing paths (e.g., set of sample timing paths).

Based at least in part on the results of the analysis, the predictor component 232 can determine and generate predicted results (as indicated at block 326 of the process flow 300). The predicted results can comprise or relate to one or more other operating conditions and/or other properties of one or more timing paths of the integrated circuit design. The DMC 202 can determine the one or more other operating conditions and/or other properties of the one or more timing paths of the integrated circuit design based at least in part on the prediction results. That is, employing inference and prediction processes, the DMC 202 can determine the one or more other operating conditions and/or other properties of the one or more timing paths of the integrated circuit design based at least in part on the vectorized input data relating to the operating condition of the timing path of the integrated circuit design and the model data of the trained model, which can be based at least in part on the vectorized data relating to the set of timing paths (e.g., set of sample timing paths).

In accordance with various embodiments, the DMC 202, another component or device, or a user can determine or design desired timing paths, electronic elements, or other features of the integrated circuit design based at least in part on the one or more other operating conditions and/or other properties of the one or more timing paths of the integrated circuit design determined from the predicted results.

In some embodiments, at a desired point during the design process (e.g., a later point in the design process when the integrated circuit design is relatively close to being finished, or when the initial design is essentially finished and being validated), the DMC 202 can perform an STA on the integrated circuit design and can feed (e.g., communicate) the STA results relating to the timing paths and properties of the integrated circuit design to the training side of the system 200 for use by the training component 224 to facilitate validating the integrated circuit design and/or performing further training (e.g., update) of the trained database 226 (e.g., the trained model of the trained database 226) to enhance the trained database 226 and enhance the prediction results produced by the predictor component 232. For instance, the DMC 202 can store the STA results, comprising information regarding the operating conditions and properties of the timing paths of the integrated circuit design, in the multi-operating condition (e.g., multi-PVT) timing database 234 (as indicated at block 328 of the process flow 300).

The vectorizer component 220 can obtain the STA results relating to the operating conditions of the timing paths of the integrated circuit design from the multi-operating condition timing database 234. The vectorizer component 220 can vectorize the STA results to generate analysis (e.g., STA) vectorized data (as indicated at block 320 of the process flow 300) associated with the operating conditions and properties of the timing paths of the integrated circuit design in a same or similar manner as the vectorizer component 220 vectorized the earlier STA results relating to the operating condition (e.g., single operating condition) of the timing path (e.g., single timing path), which was stored in the single operating condition timing database 230.

In some embodiments, the density analysis component 236 can perform a vectorization density analysis on a training dataset (e.g., vectorized dataset), comprising vectorized data, associated with the set of sample timing paths (as indicated by block 330 of the process flow 300) to determine modifications that can be made to the training dataset to mitigate (e.g., reduce, minimize, or compensate for) spatial discontinuity, missing data, or other deficiency in the training dataset and/or modifications that can be made to the timing path generation process to enhance the generation of sample timing paths in connection with generation of training datasets to mitigate spatial discontinuity, missing data, or other deficiency, in accordance with various aspects and embodiments of the disclosed subject matter. The density analysis component 236 can analyze the training dataset, comprising the vectorized data, associated with the set of sample timing paths to facilitate determining the quality of the training dataset.

Based at least in part on the results of the analysis of the training dataset, the density analysis component 236 can determine whether there is a spatial discontinuity, sparsity, missing data, and/or other deficiency in the training dataset. For instance, based at least in part on the results of the analysis of the training dataset, the density analysis component 236 can determine whether there is sparsity or missing data with regard to certain types of data (e.g., certain types of vectorized data) relating to certain types of timing paths, gate logic, cell VT, channel length, wire, or other characteristics of timing paths. As another example, based at least in part on the results of the analysis of the training dataset, the density analysis component 236 can determine whether there is spatial discontinuity between certain items of data (e.g., certain items of vectorized data) in relation to each other, wherein the certain items of data can relate to certain types of timing paths, gate logic, cell VT, channel length, wire, or other characteristics of timing paths.

If the density analysis component 236 determines that there is a spatial discontinuity, sparsity, missing data, and/or other deficiency in the training dataset, the density analysis component 236 can determine a modification that can be made to the training dataset to mitigate (e.g., reduce, minimize, or compensate for) any spatial discontinuity, sparsity, missing data, and/or other deficiency identified in the training dataset, based at least in part on the analysis results. The density analysis component 236 can modify the training dataset to mitigate (e.g., reduce, minimize, or compensate for) such spatial discontinuity, sparsity, missing data, and/or other deficiency identified in the training dataset, based at least in part on the determined modification. For example, with regard to sparsity or missing data with respect to the training dataset, the density analysis component 236 can determine what type(s) of data is sparse with respect to or missing from the training dataset, and can employ localized datapoint generation to determine and generate suitable data (e.g., vectorized data relating to timing paths) to fill in gaps in the training dataset that are due to sparse or missing data. The density analysis component 236 can modify the training dataset to include such suitable data to mitigate the sparsity in or missing data from the training dataset.

Additionally or alternatively, if the density analysis component 236 determines that there is a spatial discontinuity, sparsity, missing data, and/or other deficiency in the training dataset, the density analysis component 236 can determine a modification that can be made to the timing path generation process based at least in part on the results of the analysis of the training dataset. For instance, the density analysis component 236 can determine a modification to the random number generation (e.g., pseudo-random number generation), the mapping of numbers (e.g., random numbers) to characteristics associated with sample timing paths, and/or another sub-process of the timing path generation process to mitigate such spatial discontinuity, sparsity, missing data, and/or other deficiency identified in the training dataset to result in future sample timing paths and associated future training datasets generated by the DMC 202 not having such spatial discontinuity, sparsity, missing data, and/or other deficiency or at least having a reduced or minimized level of such spatial discontinuity, sparsity, missing data, and/or other deficiency. For example, to mitigate sparsity with regard to a particular type of timing path data (e.g., relating to a particular characteristic(s) associated with a sample timing path(s)), and correspondingly sparsity with regard to a particular type of training data (e.g., particular type of vectorized data), the density analysis component 236 can determine a modification to the random number generation to cause a particular random number(s) associated with the particular type of timing path data to be generated more frequently than it had been in order to cause that particular type of timing path data, and correspondingly the particular type of training data, to be generated more frequently so that it appears more frequently (e.g., less sparsely) in future training datasets generated by the DMC 202. The density analysis component 236, timing path generator component 210, or other component of the DMC 202 can implement the modification to the timing path generation process to enhance (e.g., improve or optimize) the timing path generation process, and correspondingly, enhance the training datasets produced by the DMC 202 and enhance the training of the trained model of the trained database 226.

In certain embodiments, the density analysis component 236 can perform a vectorization density analysis on STA results of an STA performed on an integrated circuitry design (as indicated by block 330 of the process flow 300) to enhance the generation of sample timing paths to enhance the quality of training datasets in relation to the STA, in accordance with various aspects and embodiments of the disclosed subject matter. As described herein, the DMC 202, employing STA path vectorization, can vectorize the STA results of an STA analysis performed on the integrated circuitry design to generate an STA dataset (e.g., analysis vectorized data), wherein the STA dataset can be in a vectorized form that can be the same as or similar to the vectorized format utilized to generate the vectorized data associated with the sample timing paths. The density analysis component 236 can analyze the STA dataset to facilitate determining whether the STA dataset is to have a relatively high spatially local density in a certain area(s) of the STA dataset.

Based at least in part on the results of the analysis of the STA dataset, the density analysis component 236 can determine whether the STA dataset is to have a relatively high spatially local density in a certain area(s) of the STA dataset. For instance, the density analysis component 236 can identify an area(s), if any, in the STA dataset that has a relatively higher local density relative to other areas of the STA dataset. For example, the integrated circuitry design may employ a relatively higher number of a certain type of timing paths, a relatively higher number of a certain type of gate logic, and/or a relatively higher number of cells having a particular characteristic, as compared to other types of timing paths, other types of gate logic, and/or other types of cells having other characteristics. In such instances, a certain area(s) of the STA dataset of the STA results of the STA performed on the integrated circuitry design can reflect or indicate that the integrated circuitry design has a relatively higher number of a certain type of timing paths, a relatively higher number of a certain type of gate logic, and/or a relatively higher number of cells having a particular characteristic. The density analysis component 236 can identify such certain area(s) in the STA dataset based at least in part on the results of analyzing the STA dataset.

If the density analysis component 236 determines the STA dataset is to have a relatively high spatially local density in a certain area(s) of the STA dataset, the density analysis component 236 can analyze the training dataset, comprising the vectorized data, to facilitate determining whether the training dataset has a same or similarly high spatially local density in an area(s) of the training dataset that corresponds to the relatively high spatially local density in the certain area(s) of the STA dataset. If the density analysis component 236 determines that the training dataset does have the same or substantially similar high spatially local density in an area(s) of the training dataset that corresponds to the relatively high spatially local density in the certain area(s) of the STA dataset, the density analysis component 236 can determine that no modification to the timing path generation process is to be performed.

If, however, the density analysis component 236 determines that the training dataset does not have the same or substantially similar high spatially local density in an area(s) of the training dataset that corresponds to the relatively high spatially local density in the certain area(s) of the STA dataset, the density analysis component 236 can determine a modification that can be made to the timing path generation process, based at least in part on the results of the analysis of the STA dataset and the training dataset, to facilitate modifying the generation of sample timing paths by the timing path generator component 210. The modification can be or comprise, for example, changing the timing path generation process to result in the generation of sample timing paths that can have a relatively higher number of the certain type of timing paths, a relatively higher number of the certain type of gate logic, and/or a relatively higher number of cells having the particular characteristic to correspond with the integrated circuitry design. The modified sample timing paths can be utilized by the DMC 202 to produce a modified training dataset, comprising modified vectorized data, that can have the same or substantially similar high spatially local density in the area(s) of the training dataset that can correspond to the relatively high spatially local density in the certain area(s) of the STA dataset.

In response to the density analysis component 236 determining the modification to the timing path generation process, the density analysis component 236, the timing path generator component 210, or another component of the DMC 202 can modify the timing path generation process, based at least in part on the modification, to facilitate generating the modified sample timing paths and thereby enhance generation of sample timing paths by the timing path generator component 210.

In still other embodiments, the density analysis component 236 can perform a vectorization density analysis on the analysis vectorized data (e.g., vectorized STA dataset) associated with the operating conditions and properties of the timing paths of the integrated circuit design (as indicated by block 330 of the process flow 300), to facilitate determining whether any of the analysis vectorized data is overly and undesirably represented in the analysis vectorized data (e.g., whether any type of analysis vectorized data has an undesirably high density level, as compared to the density levels of other types of analysis vectorized data). For instance, the density analysis component 236 can analyze the analysis vectorized data associated with the operating conditions and properties of the timing paths of the integrated circuit design to facilitate determining the respective densities associated with respective items of analysis vectorized data (e.g., datapoints) that are associated with respective timing paths. Depending on the particular integrated circuit design, there may be a relatively high number of timing paths that are the same or are essentially the same, and thus, are associated with respective items of analysis vectorized data that are the same or essentially the same. In such cases, if all of these respective items of analysis vectorized data associated with such timing paths are added to the vectorized dataset used for training of the trained database 226, this can or potentially can undesirably skew or bias the vectorized dataset, which can undesirably skew or bias the determination or training of the trained database 226, such that these respective items of analysis vectorized data and associated timing paths can be overly and undesirably represented in the vectorized dataset and training of the trained database 226. If not accounted for and addressed, such an undesirable skew or bias can or potentially can result in the trained database 226 undesirably focusing more on the more dense datapoints (e.g., those respective items of analysis vectorized data associated with those timing paths) and less on other cases (e.g., other types of timing paths) involving other types of analysis vectorized data, which can result in the trained database 226 being less accurate with regarding to those other cases. The density analysis component 236 can identify, account for, and/or address such undesirable over-representation (e.g., oversaturating) of datapoints in the analysis vectorized data associated with the timing paths of the integrated circuit design.

For example, based at least in part on the analysis results, the density analysis component 236 can determine or identify the relative densities associated with the respective items of analysis vectorized data associated with the timing paths of the integrated circuit design, and can determine or identify whether there are certain types of items of analysis vectorized data of timing paths that have a relatively high density as compared to other types of items of analysis vectorized data of other timing paths. If the density analysis component 236 determines that the relative densities of respective types of items of analysis vectorized data of timing paths are sufficiently in line with each other, such that none of the types of items of analysis vectorized data are associated with a density level that is unacceptably higher than the density levels associated with other types of items of analysis vectorized data, based at least in part on a defined threshold density level (e.g., density level does not exceed or otherwise satisfy the defined threshold density level), the density analysis component 236 can determine that the items of analysis vectorized data of the timing paths of the integrated circuit design can be imported into the vectorized dataset without having to alter those items of analysis vectorized data.

If, instead, the density analysis component 236 determines that there is a certain type of items of analysis vectorized data of timing paths that has a relatively high density as compared to other types of items of analysis vectorized data of other timing paths, such that the certain type of items of analysis vectorized data exceeds or otherwise satisfies the defined threshold density level, the density analysis component 236 can modify (e.g., alter, adjust, or normalize) the items of analysis vectorized data to remove or suppress some of the items of analysis vectorized data of that certain type such that the density of the remaining items of analysis vectorized data of that certain type are not overly and undesirably represented in the analysis vectorized data, normalize items of analysis vectorized data such that the certain type of items of analysis vectorized data is not overly and undesirably represented in the analysis vectorized data relative to other types of items of analysis vectorized data, or otherwise modify the analysis vectorized data such that the certain type of items of analysis vectorized data is not overly and undesirably represented in the analysis vectorized data relative to other types of items of analysis vectorized data, in accordance with the defined design management criteria (e.g., in accordance with the defined threshold density level).

In such instances, the density analysis component 236 can provide (e.g., communicate) the modified analysis vectorized data to the vectorized dataset. The training component 224 can utilize the vectorized dataset, including the modified analysis vectorized data (or analysis vectorized data for which modification was not performed in accordance with the analysis results from the vectorization density analysis), to facilitate determining or training the trained database 226, including the trained model, as more fully described herein. By having the training component 224 determine or train the trained database 226 based at least in part on the modified analysis vectorized data along with the other vectorized data, the training of the trained database 226, including the trained model, can be enhanced (e.g., can be improved and/or made even more accurate) beyond the enhancements already incorporated into the trained database 226 in accordance with the disclosed subject matter, as more fully described herein. Such additional enhancements and training of the trained database 226 utilizing the modified (or unmodified, if and as appropriate) analysis vectorized data can enhance (e.g., improve and/or make more accurate) the prediction results rendered by the predictor component 232 and determinations made by the DMC 202 regarding a desirable (e.g., suitable or optimal) integrated circuit design, enhance the design of an integrated circuit under consideration (e.g., the current integrated circuit design associated with the modified (or unmodified) analysis vectorized data, or a future integrated circuit design). For instance, with regard to a current integrated circuit design under consideration, the additional training of the trained database 226 using the modified (or unmodified) analysis vectorized data can identify a timing path(s), electronic element(s), and/or cell(s) of the current integrated circuit design that can be modified to improve the design and performance of the current integrated circuit design, based at least in part on the prediction results provided by the predictor component 232 from an analysis of the trained database 226 (as additionally trained using the modified (or unmodified) analysis vectorized data).

In accordance with various embodiments, in addition to or as an alternative to the density analysis component 236 providing the modified (or unmodified) analysis vectorized data associated with the integrated circuit design to (e.g., directly to) the vectorized dataset, the density analysis component 236 can provide such modified (or unmodified) analysis vectorized data to the DMC 202 (in vectorized form or converted to an unvectorized form) to be included with timing path data associated with the sample timing paths. The DMC 202, employing the simulator component 212, can perform a simulation of the timing path data associated with the sample timing paths and the modified (or unmodified) analysis vectorized data (in vectorized on unvectorized form) associated with the timing paths of the integrated circuit design to simulate respective operating conditions of the respective sample timing paths and the respective timing paths of the integrated circuit design based at least in part on analysis and simulation of the timing path data and modified (or unmodified) analysis vectorized data. In accordance with the process flow 300, the DMC 202 can employ other desired processes on the simulation results (such as more fully described herein) to produce a vectorized dataset (e.g., an enhanced vectorized dataset) that can be utilized to enhance the training of the trained database 226, enhance the prediction results produced by the predictor component 232, and enhance the design of an integrated circuit.

The processor component 238 can operate in conjunction with the other components (e.g., operations manager component 204, random number generator component 206, mapper component 208, timing path generator component 210, simulator component 212, . . . , data store 240) to facilitate performing the various functions of the DMC 202, such as disclosed herein. The processor component 238 can employ one or more processors (e.g., central processing units (CPUs), graphical processing units (GPUs), field-programmable gate arrays (FPGAs)), microprocessors, or controllers that can process data, such as information (e.g., data, analog or digital information) relating to operations performed by the DMC 202, etc., to facilitate analyzing information relating to an integrated circuit design, generating STA data, generating sample timing paths, generating simulation data, formatting data, abstracting data, filtering data, vectorizing data, performing statistical regression analysis on data, performing machine learning processes on data, generating a trained model and trained database, performing inference on data, rendering predictions based on data, performing calculations on data, enhancing the integrated circuit design, executing algorithms (e.g., algorithms relating to the various processes, methods, and aspects described herein), and/or performing other operations; can control data flow between the DMC 202 and other components (e.g., data store or device comprising a design database, communication network component) associated with (e.g., connected to) the DMC 202; and can control data flow between the various components of the DMC 202.

In yet another aspect, the data store 240 can store data structures (e.g., voice information, data, metadata); code structure(s) (e.g., modules, objects, classes, procedures), commands, or instructions; information relating to analyzing information relating to an integrated circuit design, generating STA data, generating sample timing paths, generating simulation data, formatting data, abstracting data, filtering data, vectorizing data, performing statistical regression analysis on data, performing machine learning processes on data, generating a trained model and trained database, performing inference on data, rendering predictions based on data, performing calculations on data, enhancing the integrated circuit design, executing algorithms (e.g., algorithms relating to the various processes, methods, and aspects described herein), and/or performing other operations; parameter data; information relating to algorithms; and so on. In an aspect, the processor component 238 can be functionally coupled (e.g., through a memory bus) to the data store 240 in order to store and retrieve information desired to operate and/or confer functionality, at least in part, to the operations manager component 204, random number generator component 206, mapper component 208, timing path generator component 210, simulator component 212, and other components disclosed herein, and/or substantially any other operational aspects of the DMC 202.

It is to be appreciated and understood that the various components of the DMC 202 can communicate information between each other and/or between other components associated with the DMC 202 as desired to carry out operations of the DMC 202. It is to be further appreciated and understood that respective components (e.g., operations manager component 204, random number generator component 206, mapper component 208, timing path generator component 210, simulator component 212, . . . , processor component 238, and/or data store 240) of the DMC 202 each can be a stand-alone unit, can be included within the DMC 202 (as depicted), can be incorporated within another component of the DMC 202, or can be a component separate from the DMC 202, and/or virtually any suitable combination thereof, as desired.

Figure 6:
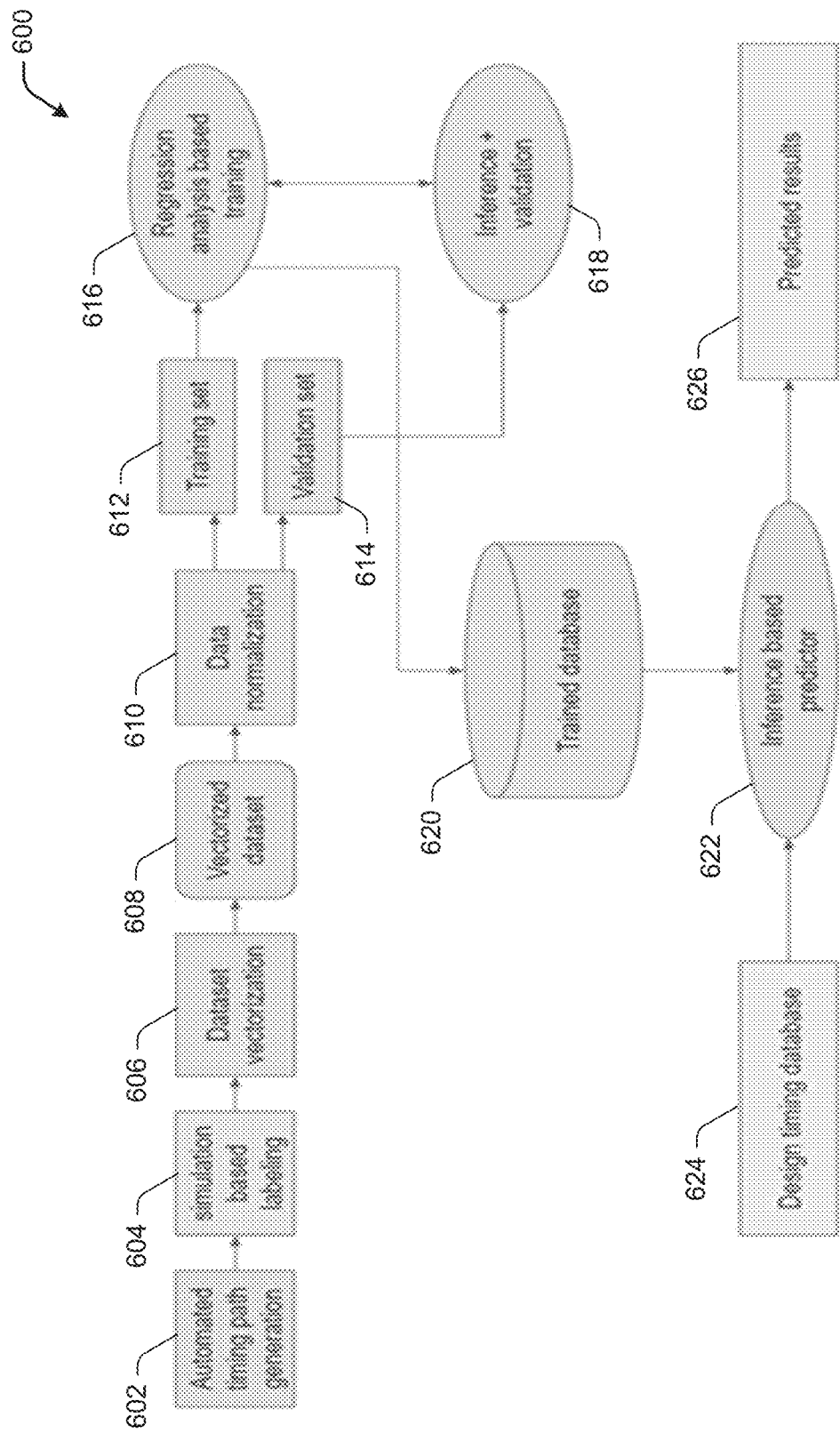
FIG. 6 depicts a block diagram of an example dataset vectorization process flow that can be performed to facilitate generating a vectorized dataset that can be employed to facilitate training a trained database, in accordance with various aspects and embodiments of the disclosed subject matter.

Turning to FIG. 6 (along with FIG. 2), FIG. 6 depicts a block diagram of an example dataset vectorization process flow 600 that can be performed to facilitate generating a vectorized dataset that can be employed to facilitate training a trained database (e.g., trained database 226), in accordance with various aspects and embodiments of the disclosed subject matter. The DMC 202 can receive respective items of timing path information relating to respective sample timing paths of a set of sample timing paths (e.g., agnostic, generic, or exemplary timing paths) from a desired source (e.g., a user, or a component or device). The DMC 202 can perform automated timing path generation (as depicted at block 602 of the process flow 600 of FIG. 6) to determine or generate respective sample timing paths of the set of sample timing paths, as more fully described herein. The sample timing paths can comprise or be associated with various electronic elements (e.g., electronic elements or other integrated circuit components, such as logic gates) in the integrated circuit design.

While various processes (e.g., simulation, abstraction, filtering, vectorization, . . . ) of the process flow 600 will be described herein with regard to the timing path information relating to respective sample timing paths of a set of sample timing paths, it is to be appreciated and understood that same or similar processes can be applied to the information relating to the timing paths determined from the analysis vectorized data (e.g., as determined and generated during the STA path vectorization process), the modified analysis vectorized data (e.g., as determined and generated during the vectorization density analysis), or other information.

The simulator component 212 can perform a simulation based labeling process to facilitate simulating operation of the respective sample timing paths (as depicted at block 604 of the process flow 600). The simulator component 212 can analyze the respective sample timing paths and/or the respective items of timing path information associated with the respective sample timing paths. Based at least in part on the results of the analysis, the simulator component 212 can simulate the respective sample timing paths (e.g., simulate the operation, performance, and/or reactions or responses of the respective sample timing paths) to generate respective items of simulation data that can be associated with (e.g., can represent, correspond to, be indicative of) the simulation of the respective timing path properties and the respective operating conditions (e.g., PVT conditions, latencies, throughput conditions, and/or parasitic conditions, . . . ) associated with the respective sample timing paths. In some embodiments, the simulation performed by the simulator component 212 can be or can comprise, for example, a spice-based simulation of the respective sample timing paths based at least in part on the respective items of timing path information.

Figure 7:
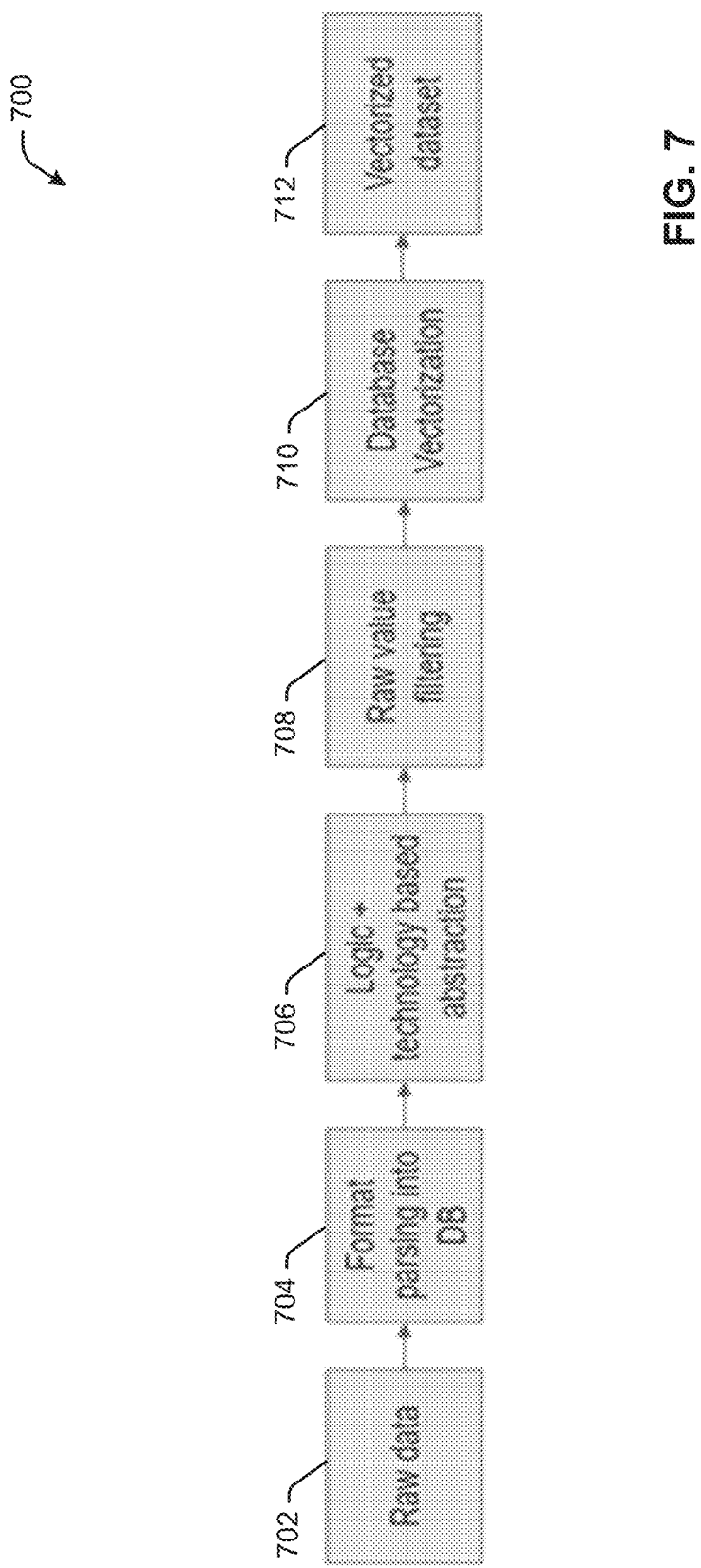
FIG. 7 illustrates a block diagram of an example dataset vectorization process flow that can be performed to format, abstract, filter, and vectorize data (e.g., simulation data) to facilitate generating a vectorized dataset that can be employed to facilitate training a trained database, in accordance with various aspects and embodiments of the disclosed subject matter.

The DMC 202 can employ the formatting component 214, abstractor component 216, filter component 218, and vectorizer component 220 to facilitate performing desired dataset vectorization on the respective items of simulation data (as depicted at block 606 of the process flow 600), which can be produced as a result of the simulation of the respective sample timing paths, to generate a vectorized dataset (e.g., vectorized data) (as depicted at block 608 of the process flow 600), as more fully described herein, for example, with regard to the process flow 300 of FIG. 3, the dataset vectorization process flow 700 of FIG. 7, or as otherwise described herein.

In certain embodiments, the normalization component 222 can perform data normalization on the vectorized data (as depicted at block 610 of the process flow 600) to normalize the respective items of vectorized data of the vectorized dataset, in accordance with the defined design management criteria. For example, the normalization component 222 can normalize the respective items of vectorized data to suppress (e.g., modify vectorized data to suppress) or remove any items of vectorized data that are determined by the normalization component 222 to be outlier data relative to other items of vectorized data.

The training component 224 can utilize the items of vectorized data to perform training with regard to operating conditions and properties of timing paths (e.g., sample timing paths or other timing paths) to generate the trained database 226 (as indicated by blocks 612, 614, 616, 618, and 620 of the process flow 600). The training component 224 can divide (e.g., partition, separate, allocate, apportion, or split, . . . ) the items of vectorized data (e.g., items of normalized vectorized data, as normalized by the normalization component 222) into a set of training data (as indicated by block 612 of the process flow 600) and a set of validation data (as indicated by block 614 of the process flow 600), in accordance with the defined design management criteria relating to database training. For example, the training component 224 can divide the items of vectorized data to allocate a desired first portion (e.g., 80%, or another desired percentage that is greater than or less than 80%) of the items of vectorized data to be the set of training data and a desired second portion (e.g., 20%, or another desired percentage that is less than or greater than 20%) of the items of the vectorized data to be the set of validation data, based at least in part on whatever respective allocations of training data and validation data is determined to be desirable (e.g., suitable or optimal), in accordance with the defined design management criteria.

The training component 224 can perform regression analysis based training on the set of training data (as indicated by block 616 of the process flow 600). For instance, the training component 224 can perform statistical regression analysis on the set of training data using a desired statistical regression analysis algorithm(s), and can generate preliminary analysis results based at least in part on the statistical regression analysis performed on the set of training data.

The training component 224 can utilize the set of validation data to facilitate performing inference and validation on the preliminary analysis results (as indicated by block 618 of the process flow 600). For example, the training component 224 can determine whether the preliminary analysis results, resulting from performing the statistical regression analysis on the set of training data, is validated based at least in part on the inference and validation process performed on the preliminary analysis results using the set of validation data. If the training component 224 determines that the preliminary analysis results are validated (e.g., the preliminary analysis results are determined to be reasonable or suitable), in accordance with the defined design management criteria relating to database training, the training component 224 can determine that the preliminary analysis results can be finalized analysis results that can be stored in the trained database (e.g., trained database 226) (as indicated by block 620 of the process flow 600).

The finalized analysis results can be, can comprise, or can be utilized to determine or generate (e.g., create) a trained model. The trained database 226 can be or can comprise the trained model, which can model the timing paths (e.g., sample timing paths or other timing paths), including modeling the respective properties and operating conditions of the timing paths. In some embodiments, the trained database 226 can comprise numerical values (e.g., vectors comprising numeric values) relating to operating conditions and properties of timing paths (e.g., sample timing paths or other timing paths) that can be desirable (e.g., suitable, acceptable, or optimal) for use by the DMC 202 in inferring, predicting, or determining operating conditions and properties of timing paths of the integrated circuit design. Desirable (e.g., suitable, acceptable, or optimal) finalized analysis results can enable the trained database 226, including the trained model, to cover not only the explicit cases (e.g., operating conditions, properties, . . . ) associated with the timing paths (e.g., sample timing paths or other timing paths) explicitly considered in forming the trained database 226, but also can be generic enough that inference and prediction can be used with the trained database 226 (e.g., trained database information of the trained database 226 that comprises or is determined based on the finalized analysis results) to infer or predict other cases (e.g., other operating conditions, other properties, . . . ) associated with other types of timing paths not explicitly covered or addressed when forming the trained database 226.

If the training component 224 determines that the preliminary analysis results are not validated, in accordance with the defined design management criteria, the training component 224 can determine that modifications are to be made to the sample timing paths, the abstraction process, the vectorization process, the training process, or another process, parameter, aspect, or criteria associated with determining or training the trained database 226 to facilitate improving preliminary analysis results and yielding preliminary analysis results that can be validated to render finalized analysis results that can be used to generate the trained database 226, in accordance with the defined design management criteria.

In some embodiments, additionally or alternatively, the training component 224 can perform desired analysis on the items of vectorized data using one or more desired machine learning techniques and algorithms to perform the training and generate the trained database 226 and associated trained model.

The disclosed subject matter can employ an inference based predictor (e.g., predictor component 232) that can receive vectorized input data from the design timing database and training information (e.g., in vectorized form) from the trained database (e.g., trained database 226) (as indicated at blocks 620, 622, and 624, respectively, of the process flow 600), wherein the vectorized input data can relate to analysis (e.g., STA) timing path data regarding an operating condition(s) and/or property(ies) associated with a timing path(s) of an integrated circuit design. The design timing database can be or can comprise the single operating condition (e.g., PVT) timing database. The inference based predictor (e.g., predictor component 232) can predict, determine, or generate predicted results regarding one or more other operating conditions associated with one or more other properties (e.g., characteristics, attributes) associated with one or more other timing paths of the integrated circuit design based at least in part on analysis of the training information (e.g., training information, in vectorized form, of the trained model and/or trained database 226) and the vectorized input data relating to the analysis timing path data regarding the operating condition(s) and/or property(ies) associated with the timing path(s) of the integrated circuit design, in accordance with the defined design management criteria (as indicated at block 626 of the process flow 600). The DMC 202 can utilize the predicted results to determine the one or more other operating conditions associated with the one or more other properties associated with the one or more other timing paths of the integrated circuit design, determine another portion (e.g., other electronic elements, other timing paths, . . . ) of the integrated circuit design, and/or determine enhancements that can be made to the integrated circuit design.

Referring to FIG. 7 (along with FIG. 2), FIG. 7 illustrates a block diagram of an example dataset vectorization process flow 700 that can be performed to format, abstract, filter, and vectorize data (e.g., simulation data) to facilitate generating a vectorized dataset that can be employed to facilitate training a trained database (e.g., trained database 226), in accordance with various aspects and embodiments of the disclosed subject matter. As part of the dataset vectorization process flow 700, the DMC 202 can generate or receive respective raw items of timing path information relating to respective sample timing paths of a set of sample timing paths. The set of sample timing paths can comprise sample timing paths that often can be found or utilized in integrated circuits or even sample timing paths that may not be typically found or utilized in integrated circuits. In some embodiments, the raw items of timing path information also can relate to other timing paths under consideration (e.g., information received from the vectorization density analysis). The DMC 202, employing the simulator component 212, can perform a simulation (e.g., a spice-based simulation) of the respective sample timing paths (or other timing paths under consideration) based at least in part on the respective raw items of the timing path information. Based at least in part on the simulation, the simulator component 212 can determine or generate simulation results, comprising raw items of the simulation data, of the respective operating conditions and timing properties, and the respective reactions or responses of, the respective sample timing paths (or other timing paths under consideration). The DMC 202 can access and receive the raw simulation results, comprising raw items of the simulation data, as generated by the simulator component 212 (as indicated by block 702 of the dataset vectorization process flow 700).

The DMC 202, employing the formatting component 214, can parse the raw items of the simulation data relating to the sample timing paths (or other timing paths under consideration) and format the raw items of the simulation data (e.g., labeled simulation data) into a database, using a desired format (e.g., desired database format), in accordance with the defined design management criteria (as indicated by block 704 of the dataset vectorization process flow 700). For instance, the formatting component 214 can parse the raw items of the simulation data. Based at least in part on the results of parsing the raw items of the simulation data, the formatting component 214 can format the raw items of the simulation data to generate items of formatted simulation data, and can insert the items of the formatted simulation data into the database using and in accordance with the desired (e.g., suitable, acceptable, or preferred) database format.

The DMC 202, employing the abstractor component 216, can perform a desired logic and technology based abstraction process on the items of the formatted simulation data to facilitate abstracting the items of the formatted simulation data (as indicated by block 706 of the dataset vectorization process flow 700). The abstractor component 216 can analyze the raw items of formatted simulation data, including the respective (e.g., unique or different) properties of the respective raw items of formatted simulation data. Based at least in part on the results of the analysis, the abstractor component 216 can abstract the raw items of formatted simulation data to generate respective representative bins associated with the respective properties (e.g., respective characteristics), wherein the respective representative bins can comprise or be associated with the respective subsets of the respective raw items of formatted simulation data, in accordance with defined design management criteria relating to abstraction of data. For instance, the abstractor component 216 can abstract a larger number (e.g., 1,000, 000) of unique properties of the sample timing paths (or other timing paths under consideration) down to a relatively smaller number (e.g., 100) of representative properties associated with the sample timing paths (or other timing paths under consideration). The abstractor component 216 can perform such data abstraction based at least in part on the respective properties, such as, for example, the respective latencies, respective slew rates, respective parasitic conditions, respective types of technologies, respective types of logic (e.g., types of logic gates), respective usage conditions, and/or respective other factors, of or associated with the respective raw items of formatted simulation data.

A representative bin and associated representative property (e.g. representative field) of the bin can encompass or be associated with a subset of unique properties of a subset of the sample timing paths (or a subset of other timing paths under consideration). For example, the abstractor component 216 can map a subset (e.g., 30 or other number determined to be appropriate) of unique properties of a subset of sample timing paths (or a subset of other timing paths under consideration) to a representative property (e.g., representative field) that can encompass the subset of unique properties at a more abstract (e.g., less detailed) level than the more detailed level of the subset of unique properties.

In certain embodiments, with regard to each representative bin, the DMC 202, employing the filter component 218, can filter raw data values of or associated with a representative bin, based at least in part on a desired filter, to generate filtered data that can be associated with (e.g., representative of) the representative bin, in accordance with defined design management criteria related to filtering of raw data, wherein the raw data values can be raw data values of the respective raw items of formatted simulation data associated with the respective unique properties of the subset of unique properties associated with the representative bin. The filter component 218, employing the desired filter, can filter the raw data values of the respective raw items of formatted simulation data of or associated with the representative bin, for example, by determining (e.g., calculating) the sum value of the raw data values, determining the mean value of the raw data values, determining the mean plus N*sigma values of the raw data values, determining the average value of the raw data values, determining the root mean square value of the raw data values, filtering out certain raw data values of certain items of the simulation data determined to be outlier data values, and/or performing other desired operations (e.g., mathematical operations) on the raw data values of the respective raw items of formatted simulation data.

The DMC 202, employing the vectorizer component 220, can perform a vectorization transformation on the filtered database to vectorize the respective items of filtered data (e.g., filtered data values) associated with respective representative bins to generate the respective items of vectorized data associated with respective representative bins, wherein there can be deterministic fields for each representative bin. In some embodiments, the vectorizer component 220 can vectorize each of the respective items of filtered data by converting (e.g., modifying) each of the items of filtered data to represent each of the items of filtered data in the form of a numeric vector (e.g., item of vectorized data) that can correspond to (e.g. be representative of) that item of filtered data.

Figure 8:
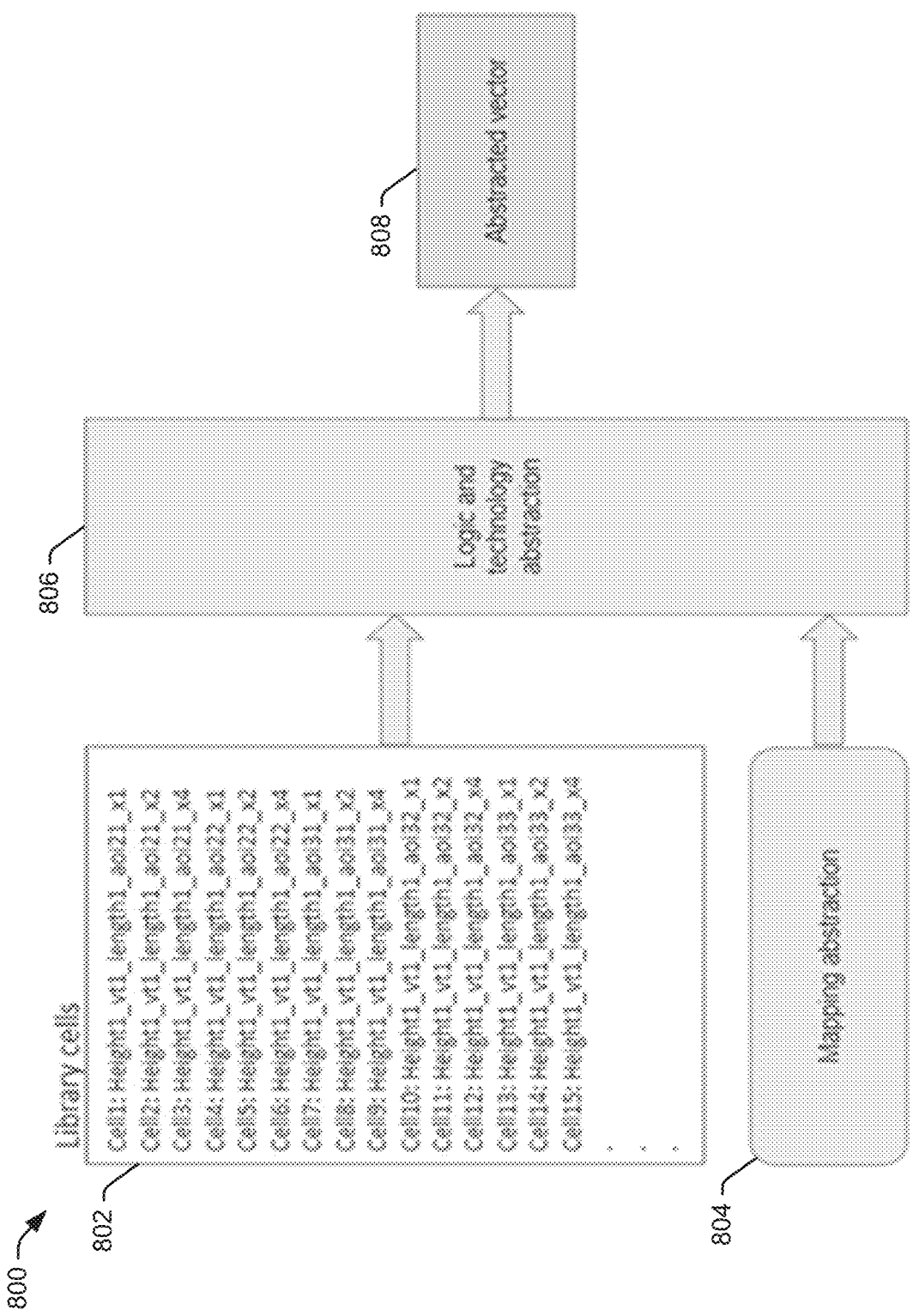
FIG. 8 illustrates a block diagram of an example, non-limiting embodiment of an abstraction process that can be employed to abstract data relating to timing paths, such as sample timing paths or other timing paths, in connection with determining or training a trained database for use in enhancing an integrated circuit design, in accordance with various aspects and embodiments of the disclosed subject matter.

Turning to FIG. 8 (along with FIG. 2), FIG. 8 illustrates a block diagram of an example, non-limiting embodiment of an abstraction process 800 that can be employed to abstract data relating to timing paths, such as sample timing paths or other timing paths, in connection with determining or training a trained database for use in enhancing an integrated circuit design, in accordance with various aspects and embodiments of the disclosed subject matter. In accordance with the abstraction process 800, there can be library cells that can be sample (e.g., example, exemplary, or agnostic) library cells that can be expected to often be utilized in integrated circuit designs (as indicated at block 802 of the abstraction process 800). The library cells can comprise a variety of cells, such as, for example, Cell1, Cell2, Cell3, . . . , and/or Cell15, etc.

The respective cells of the library cells can have respective properties (e.g., characteristics, attributes, and/or specifications, . . . ). The respective properties can comprise, for example, channel height of a cell, channel length of a cell, a voltage threshold of a cell, a general type of logic gate of a cell, a particular type or configuration of a cell, a drive strength of a cell, and/or other desired properties of a cell. For example, the example cells (e.g., Cell1 through Cell15) of the library cells can have respective channel heights, wherein, in this example, the respective cells can each have a channel height of Height1, which can represent a certain channel height. The example cells of the library cells can have respective channel lengths, wherein, in this example, the respective cells can each have a channel length of length1, which can represent a particular channel length. The example cells of the library cells can have respective voltage thresholds (vt), wherein, in this example, the respective cells can each have a voltage threshold of vt1, which can represent a specified voltage threshold.

The example cells of the library cells also can be respective general types of logic gates, wherein, in this example, the respective cells each can be an AND-OR-Inverter (aoi), although in a variety of other embodiments, there can be a variety of other general types of logic gates employed in connection with an integrated circuit design or analysis relating to an integrated circuit design. The example cells of the library cells also can be respective particular types or configurations of logic gates, wherein, in this example, some of the cells (e.g., Cell1, Cell2, and Cell3) can be aoi21, certain other cells (e.g., Cell4, Cell5, and Cell6) can be aoi22, still other cells (e.g., Cell7, Cell8, and Cell9) can be aoi31, other cells (e.g., Cell10, Cell11, and Cell12) can be aoi32, and yet other cells (e.g., Cell13, Cell14, and Cell15) can be aoi33. An aoi21 can be, for example, a two-input AND gate and a one-input AND gate (e.g., a wire) all feeding into a two-input NOR gate; an aoi22 can be a two-by-two (2×2) Input AND-NOR Gate; an aoi31 can be a three-input AND gate and a one-input AND gate (a wire) all feeding into a two-input NOR gate; and the other particular aoi types (e.g., aoi32, aoi33) can be understood and derived, accordingly.

The example cells of the library cells each can have respective drive strengths. In this particular example of library cells, some of the cells (e.g., Cell1, Cell4, Cell7, Cell10, Cell13) can have a drive strength of 1 (e.g., ×1), certain other cells (e.g., Cell2, Cell5, Cell8, Cell11, Cell14) can have a drive strength of 2 (e.g., ×2), and still other cells (e.g., Cell3, Cell6, Cell9, Cell12, Cell15) can have a drive strength of 4 (e.g., ×4). With regard to a set of properties associated with a set of timing paths (e.g., sample timing paths and/or other timing paths under consideration), the DMC 202, employing the abstractor component 216, can perform a mapping abstraction to facilitate mapping respective (e.g., unique) properties of respective timing paths of the set of timing paths to respective representative properties of a set of representative properties (as indicated at block 804 of the abstraction process 800), wherein the respective representative properties can be associated with respective representative bins.

In accordance with the example abstraction process 800, the abstractor component 216 can perform logic and technology abstraction to abstract data, such as, for example, simulation data of simulation results of the simulation of the timing paths associated with the cells of the library cells, based at least in part on the information (e.g., simulation data of simulation results associated with sample timing paths or other timing paths) relating the cells of the library cells and the mapping abstraction (as indicated at block 806 of the abstraction process 800), as more fully described herein. For instance, the abstractor component 216 can map (e.g., employing the mapping abstraction) a subset (e.g., 30 or other number determined to be appropriate) of respective (e.g., particular or unique) properties associated with a subset of sample timing paths (or a subset of other timing paths under consideration) to a representative property (e.g., a representative field associated with a representative property) that can encompass the subset of respective properties at a more abstract (e.g., less detailed) level than the more detailed level of the subset of respective properties, based at least in part on the information (e.g., the simulation data) relating the cells of the library cells and the mapping abstraction, wherein the representative property can be associated with a representative bin. Such abstraction can be performed by the abstractor component 216 for each of a number of subsets of respective properties associated with respective subsets of sample timing paths (or a subset of other timing paths under consideration) to a respective representative property of a set of representative properties and associated respective representative bin of a set of representative bins. For example, with regard to a relatively high number (e.g., 1,000,000 or other desired higher number) of unique properties associated with the sample timing paths (or other timing paths under consideration), the abstractor component 216 can map respective unique properties of the relatively high number of unique properties (e.g., employing the mapping abstraction and logic and technology abstraction processes) to respective representative properties of a relatively lower number (e.g., 100 or other desired lower number) of respective representative properties that can be associated with respective representative bins.

As a result of the logic and technology abstraction performed in the abstraction process 800 (as indicated at block 806 of the abstraction process 800), the DMC 202 can generate abstracted vectors (as indicated at block 808 of the abstraction process 800), wherein the abstracted vectors, as desirably processed (e.g., further processed, where appropriate), can be utilized to facilitate determining or training the trained database 226, as more fully described herein. The abstracted vectors can be vectorized data, which can be produced based at least in part on abstracted data (e.g., items of abstracted data) that can be determined or generated from the logic and technology abstraction process (e.g., as indicated at block 806), wherein the abstracted data can be filtered to generate filtered data, and wherein the filtered data can be vectorized to generate vectorized data, which can be normalized, as more fully described herein, to result in vectorized data (e.g., items of normalized vectorized data) that can be used to facilitate determining or training the trained database 226.

With further regard to vectorization of data (e.g., items of data derived from simulation results) relating to timing paths (e.g., sample timing paths or other timing paths under consideration), the DMC 202 (e.g., employing the vectorizer component 220) can employ a desired vector format, comprising various respective formats, in connection with vectorizing data, in accordance with the defined design management criteria. The DMC 202 can structure the various formats around a timing estimator. With regard to an operating condition vector (e.g., a PPVT vector), the DMC 202 can structure the operating condition vector to have a desired number of field positions that can denote a simulation condition (e.g., a simulation condition obtained from the simulation of sample timing paths) as a numerical vector. The respective field positions of the operating condition vector can be space delimited, as desired, and each of the field positions can have an appropriate numerical value, which, in some embodiments, can be a relatively small numerical value. In accordance with various embodiments, the desired number of field positions can be 5 field positions, more than 5 field positions, or less than 5 field positions, as indicated or specified by the defined design management criteria.

With regard to the wire process, the wire process can be desirably quantized (e.g., very or significantly quantized), and, as a result, it can be desirable to assign numerical values to a field. Table 1 provides some example numerical values that can be assigned to a field (e.g., by the DMC 202) with regard to a 7 nm integrated circuit design.

TABLE 1

Example wire process

| Wire corner | Vector value (e.g., process sigma from mean) |
|---|---|
| RCWorst | −3 |
| RCWorst_CCWorst_T | −3.2 |
| RCWorst_CCWorst | −3.5 |
| CWorst | −2 |
| CWorst_CCWorst_T | −2.2 |
| CWorst_CCWorst | −2.5 |
| Typical | 0 |
| Typical_CCbest | 0.5 |
| Typical_CCWorst | −0.5 |
| Cbest | 2 |
| Cbest_CCbest_T | 2.2 |
| Cbest_CCbest | 2.5 |
| RCbest | 3 |
| RCbest_CCbest_T | 3.2 |
| RCbest_CCbest | 3.5 |

It is to be appreciated and understood that, in other embodiments, depending on the type of circuitry, type of technology, etc., the disclosed subject matter can employ additional or different fields and/or can assign additional or different numerical values to the fields than those provided in the example TABLE 1.

With regard to the gate process of Nfet, the gate process can have, for example, a monte-carlo supported process variation associated with it, however, the disclosed subject matter can start with a corner based simulation condition. In some embodiments, the disclosed subject matter (e.g., the DMC 202) can employ a look-up table, such as example TABLE 2, that can include desired vector values for various process corners (e.g., basically S=−3, T=0, F=3).

TABLE 2

Example gate process - Nfet

| Process corner | Vector value (e.g., process sigma from mean) |
|---|---|
| SS | −3 |
| SF | −3 |
| TT | 0 |
| FS | 3 |
| FF | 3 |

It is to be appreciated and understood that, in other embodiments, depending on the type of circuitry, type of technology, etc., the disclosed subject matter can employ additional or different process corners and/or can assign additional or different numerical vector values than those provided in the example TABLE 2.

With regard to the gate process of Pfet, the gate process can have, for example, a monte-carlo supported process variation associated with it, however, the disclosed subject matter can start with a corner based simulation condition. In some embodiments, the disclosed subject matter (e.g., the DMC 202) can employ a look-up table, such as example TABLE 3, that can include desired vector values for various process corners (e.g., basically S=−3, T=0, F=3).

TABLE 3

Example gate process - Pfet

| Process corner | Vector value (e.g., process sigma from mean) |
|---|---|
| SS | −3 |
| SF | 3 |
| TT | 0 |
| FS | −3 |
| FF | 3 |

It is to be appreciated and understood that, in other embodiments, depending on the type of circuitry, type of technology, etc., the disclosed subject matter can employ additional or different process corners and/or can assign additional or different numerical vector values than those provided in the example TABLE 3.

As a non-limiting example of operating condition vectors, to describe an operating condition (e.g., a PPVT condition) of typical RC, TT, 0.7V (0.7 volts (V)), 100 C (e.g., 100 degrees Celsius (C)), the DMC 202 can generate an operating condition vector as: [0 0 0 0.7 100], wherein the 0 values in the first three fields of the vector can be obtained from TABLE 1, TABLE 2, and/or TABLE 3 (e.g., wire corner of Typical can have a vector value of 0; process corner of TT can have a vector value of 0), and wherein the 0.7 in the fourth field of the vector can represent the 0.7V value, and the 100 in the fifth field of the vector can represent the 100 C value. As another non-limiting example of operating condition vectors, to describe an operating condition (e.g., a PPVT condition) of typical rcworst_cc-worst_T, SS, 0.8V (0.8 volts (V)), −40 C (e.g., −40 degrees Celsius (C)), the DMC 202 can generate the operating condition vector as: [−3.2 −3 −3 0.8 −40],], wherein the 0 values in the first three fields of the vector can be obtained from TABLE 1, TABLE 2, and/or TABLE 3 (e.g., wire corner of rcworst_ccworst_T can have a vector value of −3.2; process corner of SS can have a vector value of −3), wherein the 0.8 in the fourth field of the vector can represent the 0.8V value, and the −40 in the fifth field of the vector can represent the −40 C value.

In certain embodiments, the DMC 202 can employ an abstract gate list that can comprise desired gate abstractions, which the DMC 202 can utilize in abstracting data (e.g., simulation data of simulation results) relating to sample timing paths. For example, with regard to logic functions of logic gates, the gate (e.g., logic gate) abstractions employed by the DMC 202 can support various logic functions including: 1 stack; 2 stack; 3 stack; 4 stack; 2 stage gate, with both stages being an inverter; 2 stage gate, with the first stage being 2-stack and the second stage being an inverter (e.g., clock gater clock-to-out time (tcq) can be included in this); 3 stage flip-flop (clock-to-out time (tcq)); 4 stage flip-flop (tcq); flip-flop (input setup time (tsu)); flip-flop (input hold time (thold)); clock-gater/latch (tsu); and/or clock-gater/latch (thold). It is to be appreciated and understood that, in accordance with various embodiments, the disclosed subject matter is not limited to these logic functions and gate abstractions, and the disclosed subject matter can employ additional or alternative logic functions and gate abstractions than those referenced above.

In certain embodiments, in terms of gate voltage threshold (vt) types, the DMC 202 can employ libraries (e.g., 7 nm libraries or other type of libraries) that can be based at least in part on ULVT, LVT, or SVT. If the process VT changes, the DMC 202 can adjust the libraries accordingly.

With regard to channel length, the disclosed subject matter can comprise desired channel length values that can be supported by the integrated circuit technology employed. For example, with regard to 7 nm integrated circuit technology, for channel length, there can be two channel length values that can be supported in 7 nm integrated circuit technology, such as 8 nm and 11 nm. This quantization can be desirable (e.g., suitable, optimal, perfect, or substantially perfect) for dimension bounding. Other process nodes can have something similar to this. There can be different (e.g., two different) cell heights in 7 nm integrated circuit technology (e.g., H240 and H300). The DMC 202 can employ a same or similar database with regard to the different cell heights (e.g., if determined to be suitable), or can utilize respective databases having respective dimensionalities with regard to the different cell heights.

In some embodiments, with regard to a simulated data storage vector (SDSV), the DMC 202 can separate the simulated data associated with timing paths (e.g., sample timing paths) by the types of information the DMC 202 can desire to collect. The types of information can comprise, for example, output transition unateness, mean delay, mean input slew rate/mean data slew rate (flip-flop or latch), mean output slew rate/mean clock slew rate (flip-flop or latch), sigma of delay, slew rates, and/or other desired types of information. In certain embodiments, the storage vector (e.g., SDSV) can be a singular line of data, space delimited, to store the simulation results. Each field can correspond to the values represented by the various components of the timing path. In many cases, the timing path will not have each field populated with particular values, and, with regard to a field that is not populated with a particular value, the DMC 202 can assign such field a desired value (e.g., a default value, which can be 0). Each entry can be meant to represent a single path of simulation, while maintaining flexibility to support additional fields.

With regard to dataset format, the DMC 202 can employ a dataset format that can be based at least in part on combining of multiple vectors to describe the timing path, the PPVT it was simulated in and the PPVT it is meant to estimate. All fields in the dataset format can be space delimited, and in the vector based representation, it can be, for example: [PPVT$_{start}$ SDSV$_{PPVTstart}$ PPVT$_{target}$]. This can be the entry the DMC 202 can pass in for inference. In the case of the training dataset, the label also can be present so each entry can be represented as, for example: [PPVT$_{start}$ SDSV$_{PPVTstart}$ PPVT$_{target}$]: label (full path delay of PPVT$_{target}$).

In view of the example systems described above, methods that may be implemented in accordance with the described subject matter may be better appreciated with reference to the flow charts of FIGS. 9-14. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 9:
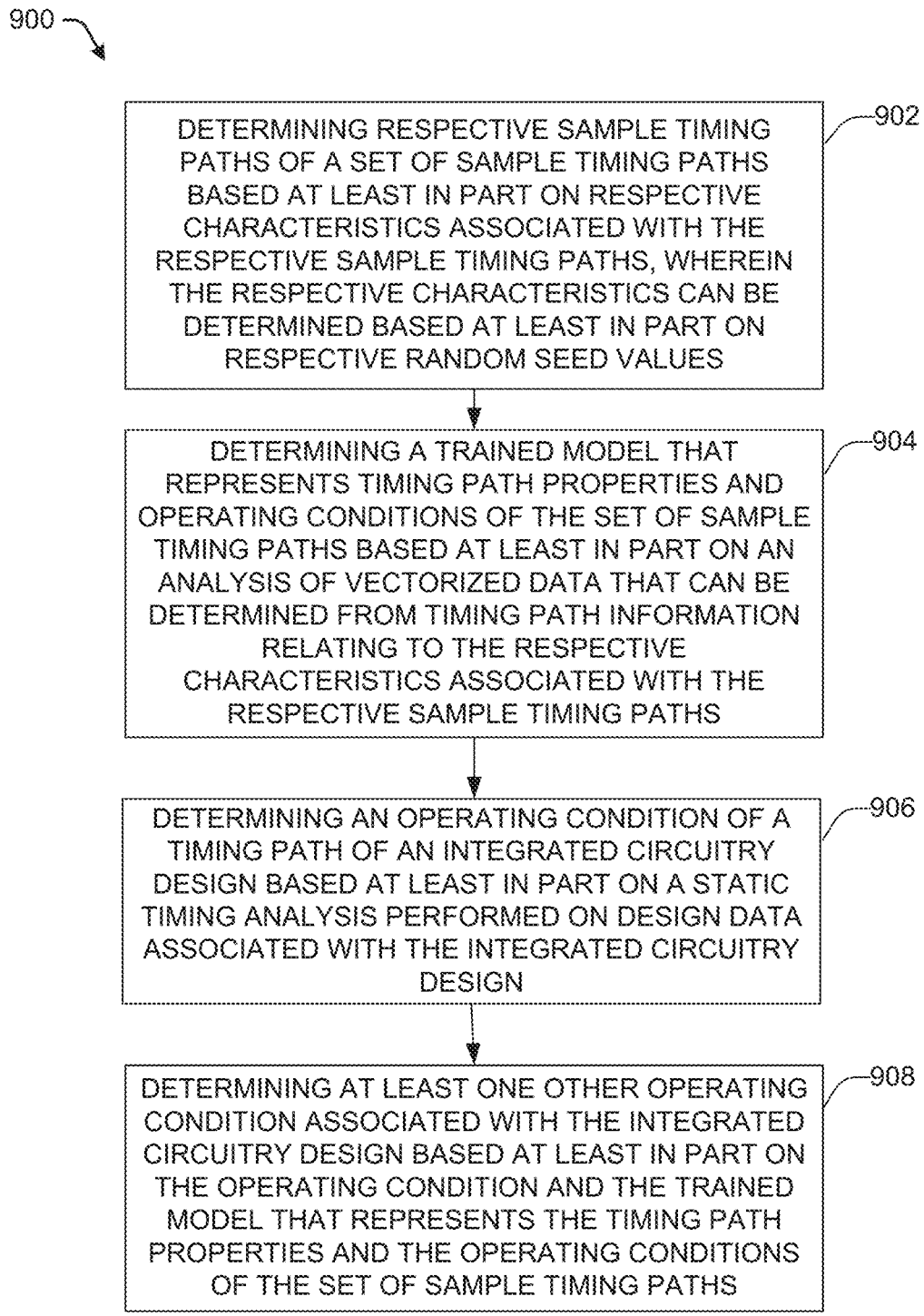
FIG. 9 depicts a flow diagram of an example method that can efficiently enhance an integrated circuit design by employing multi-operating condition frequency determination or prediction for statically timed designs through automated and randomized timing path generation and statistical analysis, in accordance with various aspects and embodiments of the disclosed subject matter.

FIG. 9 depicts a flow diagram of an example method 900 that can efficiently enhance an integrated circuit design by employing multi-operating condition frequency determination or prediction for statically timed designs through automated and randomized timing path generation and statistical analysis, in accordance with various aspects and embodiments of the disclosed subject matter. The method 900 can determine timing path frequency associated with an integrated circuitry design, for example. For instance, the method 900 can perform multi-operating condition frequency determinations and/or predictions for statically timed integrated circuit designs that can be facilitated by automated and randomized timing path generation and statistical analysis. The method 900 can be implemented by a system that can comprise the DMC, a processor component, and/or a data store, for example.

At block 902, respective sample timing paths of a set of sample timing paths can be determined based at least in part on respective characteristics associated with the respective sample timing paths, wherein the respective characteristics can be determined based at least in part on respective random seed values. In connection with determining and generating (e.g., automatically determining and generating) the set of sample timing paths, the DMC can determine the respective characteristics for the respective sample timing paths based at least in part on the respective random seed values.

For instance, the DMC, employing a random number generator component, can generate respective random numbers. The DMC can utilize the respective random numbers to determine the respective characteristics for the respective sample timing paths. For instance, the DMC can generate a mapping that can map random numbers to respective characteristics (e.g., a number of gates; a number of wires; a type of function, component (e.g., path component), property, or feature; and/or a parameter value(s) associated with the type of function, component, property, or feature) of a sample timing path, or portion thereof. For example, with regard to determining a gate or a wire of a sample timing path, the DMC can reference a random number generated with respect to the gate or wire in the mapping, and can determine the characteristic(s) the gate or wire is to have based at least in part on the mapping, as more fully described herein. The DMC can determine (e.g., automatically determine) the respective sample timing paths of the set of sample timing paths based at least in part on the respective characteristics associated with the respective sample timing paths, as such respective characteristics are determined based at least in part on the respective random seed values.

At block 904, a trained model that represents timing path properties and operating conditions of the set of sample timing paths can be determined based at least in part on an analysis of vectorized data that can be determined from timing path information relating to the respective characteristics associated with the respective sample timing paths. The DMC can determine or create the trained model, which can model or represent the timing path properties and the operating conditions of the set of sample timing paths, based at least in part on results of the analysis of the vectorized data, wherein the vectorized data can be determined (e.g., by the DMC) from the timing path information relating to the respective characteristics associated with the respective sample timing paths. In accordance with various embodiments, the DMC can perform a defined analysis on the vectorized data to facilitate training, determining, and/or creating the trained model. For example, the DMC can perform the defined analysis on the vectorized data using a desired training algorithm that can relate to statistical regression analysis, neural networks, or other desired machine learning techniques.

In certain embodiments, the DMC can perform a simulation (e.g., a spice-based simulation) of the sample timing paths, based at least in part on the respective timing path information of the respective sample timing paths, to generate simulation data that can simulate the respective timing path properties and respective operating conditions of the respective sample timing paths. The DMC can perform a vectorization process (e.g., spice path vectorization) on the simulation data to generate the vectorized data (e.g., convert the simulation data to vectorized data) that can represent the respective timing path properties and the respective operating conditions of the respective sample timing paths as respective numerical vectors, as more fully described herein.

At block 906, an operating condition of a timing path of an integrated circuitry design can be determined based at least in part on a static timing analysis performed on design data associated with the integrated circuitry design. The DMC, employing the STA component, can perform the STA on the design data associated with the integrated circuitry design, and can determine the operating condition of the timing path of the integrated circuitry design based at least in part on the results of the STA.

At block 908, at least one other operating condition associated with the integrated circuitry design can be determined based at least in part on the operating condition and the trained model that represents the timing path properties and the operating conditions of the set of sample timing paths. The DMC can predict and/or determine the at least one other operating condition associated with the integrated circuitry design based at least in part on the operating condition and the trained model.

Figure 10:
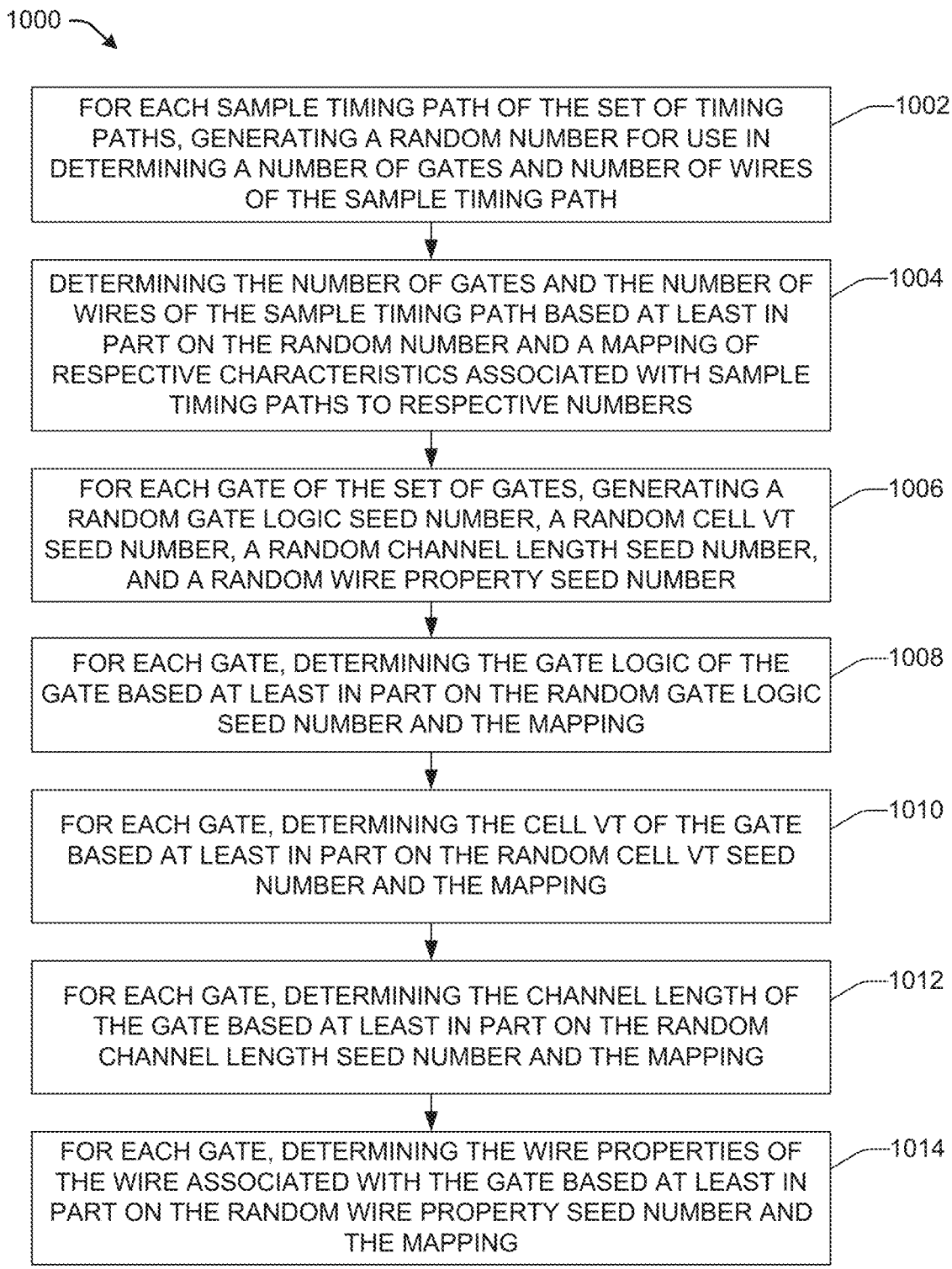
FIG. 10 illustrates a flow diagram of an example method that can determine sample timing paths that can be utilized to facilitate training a trained model that can desirably model or represent the sample timing paths to efficiently enhance an integrated circuit design, in accordance with various aspects and embodiments of the disclosed subject matter.

FIG. 10 illustrates a flow diagram of an example method 1000 that can determine sample timing paths that can be utilized to facilitate training a trained model that can desirably model or represent the sample timing paths to efficiently enhance an integrated circuit design, in accordance with various aspects and embodiments of the disclosed subject matter. The sample timing paths can comprise the types of timing paths that can be expected to be implemented in an integrated circuit design (or other timing paths, such as, e.g., timing paths of an integrated circuit design). The method 1000 can be utilized to determine and generate each sample timing path of a set of sample timing paths. The method 1000 can be implemented by a system that can comprise, for example, the DMC, a processor component, and/or a data store.

At block 1002, for each sample timing path of the set of timing paths, a random number can be generated for use in determining a number of gates and number of wires of the sample timing path. At block 1004, the number of gates and the number of wires of the sample timing path can be determined based at least in part on the random number and a mapping of respective characteristics associated with sample timing paths to respective numbers. The DMC, employing a random number generator, can generate the random number for use in determining the number of gates and number of wires of the sample timing path. In some embodiments, the DMC can reference the random number in a mapping of respective characteristics associated with sample timing paths to respective numbers (e.g., random numbers), and, with regard to the characteristic of number of gates and number of wires in the mapping, the DMC can determine number (e.g., N) of gates and number (e.g., N−1) of wires that can correspond to the random number. The DMC or another component can generate the mapping of respective characteristics associated with sample timing paths to respective numbers.

At block 1006, for each gate of the set of gates (e.g., the number of gates), a random gate logic seed number, a random cell VT seed number, a random channel length seed number, and a random wire property seed number can be generated. The DMC, employing the random number generator, can generate (e.g., randomly generate) the random gate logic seed number, the random cell VT seed number, the random channel length seed number, and the random wire property seed number.

At block 1008, for each gate of the set of gates, the gate logic of the gate can be determined based at least in part on the random gate logic seed number and the mapping. For each gate of the set of gates, the DMC can determine the gate logic (e.g., characteristics of the gate logic) of the gate based at least in part on the random gate logic seed number and the mapping. For instance, the DMC can reference the random gate logic seed number in the mapping to determine the gate logic (e.g., gate logic function) and associated properties associated with (e.g., linked or mapped to) the random gate logic seed number in the mapping. The characteristics of the gate logic and associated properties can comprise, for example, the type of gate logic or function (e.g., AND gate, NAND gate, OR gate, NOR gate, XOR gate, XNOR gate, inverter gate, AND-OR-Invert gate, OR-AND-Invert gate, MUX, DEMUX, adder component, storage element (e.g., a flip-flop or latch element), or other type of gate), type of transistors or other gate components (e.g., p-channel transistor, n-channel transistor, or p-channel and n-channel transistor, . . . ), the number of inputs to the logic gate (e.g., 1 input, 2 inputs, or 3 inputs, . . . ), the number of outputs (e.g., 1 output, 2 outputs, or 3 outputs, . . . ) of the logic gate, and/or other properties or features of the gate logic.

At block 1010, for each gate, the cell VT of the gate can be determined based at least in part on the random cell VT seed number and the mapping. For each gate of the set of gates, the DMC can determine the cell VT (e.g., characteristics of the cell VT) of the gate based at least in part on the random cell VT seed number and the mapping. For instance, the DMC can reference the random cell VT seed number in the mapping to determine the cell VT and associated properties associated with the random cell VT seed number in the mapping. Depending on the type of gate or cell (e.g., cell with which the gate is associated), the cell VT can comprise one or more VT values or attributes (e.g., SVT, LVT, or ULVT).

At block 1012, for each gate, the channel length of the gate can be determined based at least in part on the random channel length seed number and the mapping. For each gate of the set of gates, the DMC can determine the channel length (e.g., characteristics of the channel length) of the gate based at least in part on the random channel length seed number and the mapping. For example, the DMC can reference the random channel length seed number in the mapping to determine the channel length and associated properties associated with the random channel length seed number in the mapping.

At block 1014, for each gate, the wire properties of the wire associated with the gate can be determined based at least in part on the random wire property seed number and the mapping. For each gate of the set of gates, the DMC can determine the wire properties of the wire (e.g., characteristics of the wire) associated with the gate based at least in part on the random wire property seed number and the mapping. For example, the DMC can reference the random wire property seed number in the mapping to determine the wire properties of the wire associated with the random wire property seed number in the mapping.

Figure 11:
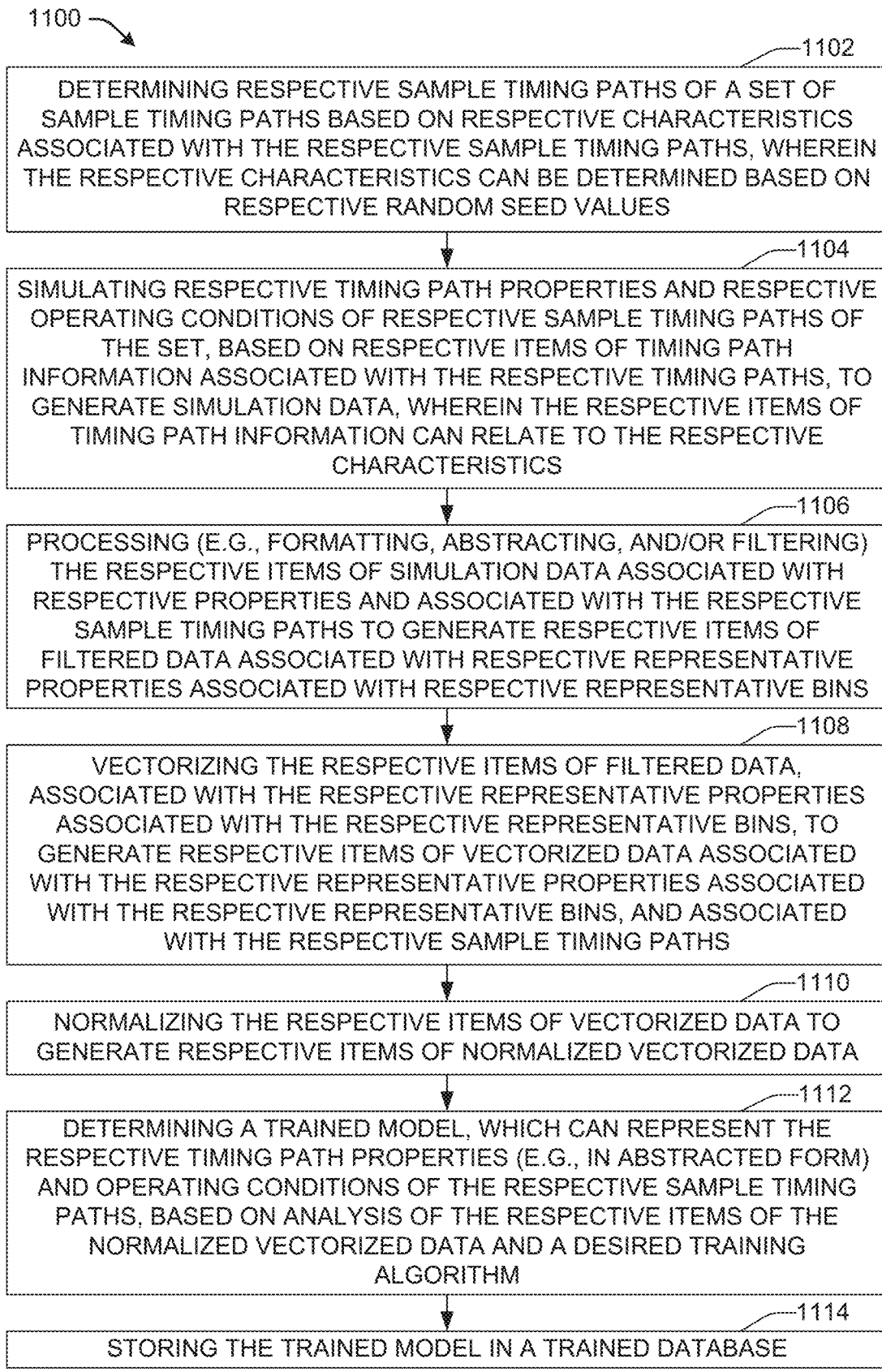
FIG. 11 presents a flow diagram of an example method that can determine a trained model that can desirably model or represent sample timing paths that can be the types of timing paths that can be expected to be implemented in an integrated circuit design (or other timing paths, such as, e.g., timing paths of an integrated circuit design), to efficiently enhance the integrated circuit design, in accordance with various aspects and embodiments of the disclosed subject matter.

FIG. 11 presents a flow diagram of an example method 1100 that can determine a trained model that can desirably model or represent sample timing paths that can be the types of timing paths that can be expected to be implemented in an integrated circuit design (or other timing paths, such as, e.g., timing paths of an integrated circuit design), to efficiently enhance the integrated circuit design, in accordance with various aspects and embodiments of the disclosed subject matter. The method 1100 can be implemented by a system that can comprise the DMC, a processor component, and/or a data store, for example.

At block 1102, respective sample timing paths of a set of sample timing paths can be determined based at least in part on respective characteristics associated with the respective sample timing paths, wherein the respective characteristics can be determined based at least in part on respective random seed values. In connection with determining and generating (e.g., automatically determining and generating) the set of sample timing paths, the DMC can determine the respective characteristics for the respective sample timing paths based at least in part on the respective random seed values, as more fully described herein.

At block 1104, respective timing path properties and respective operating conditions of respective sample timing paths of the set of sample timing paths can be simulated, based at least in part on the respective items of timing path information associated with the respective sample timing paths, to generate simulation data, wherein the respective items of timing path information can relate, at least in part, to the respective characteristics associated with the respective sample timing paths. The DMC can perform a simulation of the respective sample timing paths, based at least in part on the respective items of timing path information, to generate the simulation data that can simulate the respective timing path properties and the respective operating conditions (e.g., PVT conditions, latencies, throughput conditions, and/or parasitic conditions of timing paths, . . . ) of the respective sample timing paths. In some embodiments, the simulation can be or can comprise, for example, a spice-based simulation of the respective sample timing paths based at least in part on the respective items of timing path information.

At block 1106, the respective items of simulation data associated with respective properties and associated with the respective sample timing paths can be processed (e.g., formatted, abstracted, and/or filtered) to generate respective items of filtered data associated with respective representative properties associated with respective representative bins, in accordance with the defined design management criteria relating to such processing of such data. The DMC can process the respective items of simulation data to format the such simulation data to generate respective items of formatted data, abstract the respective items of formatted data to generate respective items of abstracted data associated with the respective representative properties associated with the respective representative bins, and filter the respective items of abstracted data to generate respective items of filtered data associated with the respective representative properties associated with the respective representative bins, as more fully described herein.

At block 1108, the respective items of filtered data, associated with the respective representative properties associated with the respective representative bins, can be vectorized to generate respective items of vectorized data associated with the respective representative properties associated with the respective representative bins, and associated with the respective sample timing paths, in accordance with defined design management criteria relating to vectorization of data. The DMC can vectorize (e.g., perform a vector transformation process on) the respective items of filtered data to generate the respective items of vectorized data, in accordance with the defined design management criteria, as more fully described herein. The DMC can determine and generate the respective items of the vectorized data such that they can represent (e.g., in an abstract and vectorized form) the respective items of simulation data associated with the respective sample timing paths in a desired numeric form (e.g., as numeric vectors).

At block 1110, the respective items of vectorized data can be normalized to generate respective items of normalized vectorized data. The DMC can normalize the respective items of vectorized data to generate the respective items of normalized vectorized data, as more fully described herein.

At block 1112, a trained model, which can represent the respective timing path properties (e.g., in abstracted form) and operating conditions of the respective sample timing paths, can be determined based at least in part on an analysis of the respective items of the normalized vectorized data and a desired training algorithm. The DMC can determine, create (e.g., generate), or train the trained model, which can represent the respective timing path properties (e.g., in abstracted form) and the respective operating conditions associated with the respective sample timing paths, based at least in part on the results of the analysis of the respective items of the normalized vectorized data.

In certain embodiments, the analysis can be or can comprise, for example, a statistical regression analysis that the DMC can perform on the respective items of the vectorized data, in accordance with the desired training algorithm. For example, the DMC can divide (e.g., allocate or apportion) the respective items of the vectorized data (e.g., normalized vectorized data) into a set of training data and a set of validation data, and can perform the statistical regression analysis on the set of training data and validate, or at least attempt to validate, the results of the statistical regression analysis using the set of validation data, as more fully described herein. In other embodiments, the analysis can be, can comprise, or can involve the use of a desired (e.g., a defined, and suitable or optimal) training algorithm relating to neural networks or other machine learning techniques.

The desired training algorithm can be a training algorithm that can be suitable (e.g., acceptable or optimal) for determining a trained model that can represent the respective timing path properties and operating conditions of the respective sample timing paths. For instance, employing the desired training algorithm, the DMC can map the respective items of vectorized data across respective operating conditions that can be associated with timing paths that potentially can be associated with an integrated circuit design to generate the trained model such that respective timing paths (e.g., training timing paths) of the trained model can react as they would expected to react with respect to respective properties and operating conditions. For instance, based at least in part on the mapping, a particular training timing path of the trained model can react in a same or similar manner (e.g., can have same or similar properties) under operating conditions (e.g., PVT conditions) as an actual timing path of an integrated circuit design under such operating conditions.

At block 1114, the trained model can be stored in a trained database in a data store. The DMC can store the trained model, which can comprise model data that can represent the respective properties (e.g., in abstracted form) and operating conditions associated with the respective sample timing paths, in the trained database in the data store. The DMC can utilize the trained model to predict or determine other operating conditions associated with an integrated circuitry design (e.g., other operating conditions with respect to other timing paths of the integrated circuit design) based at least in part on the operating condition and the trained model, as more fully described herein.

Figure 12:
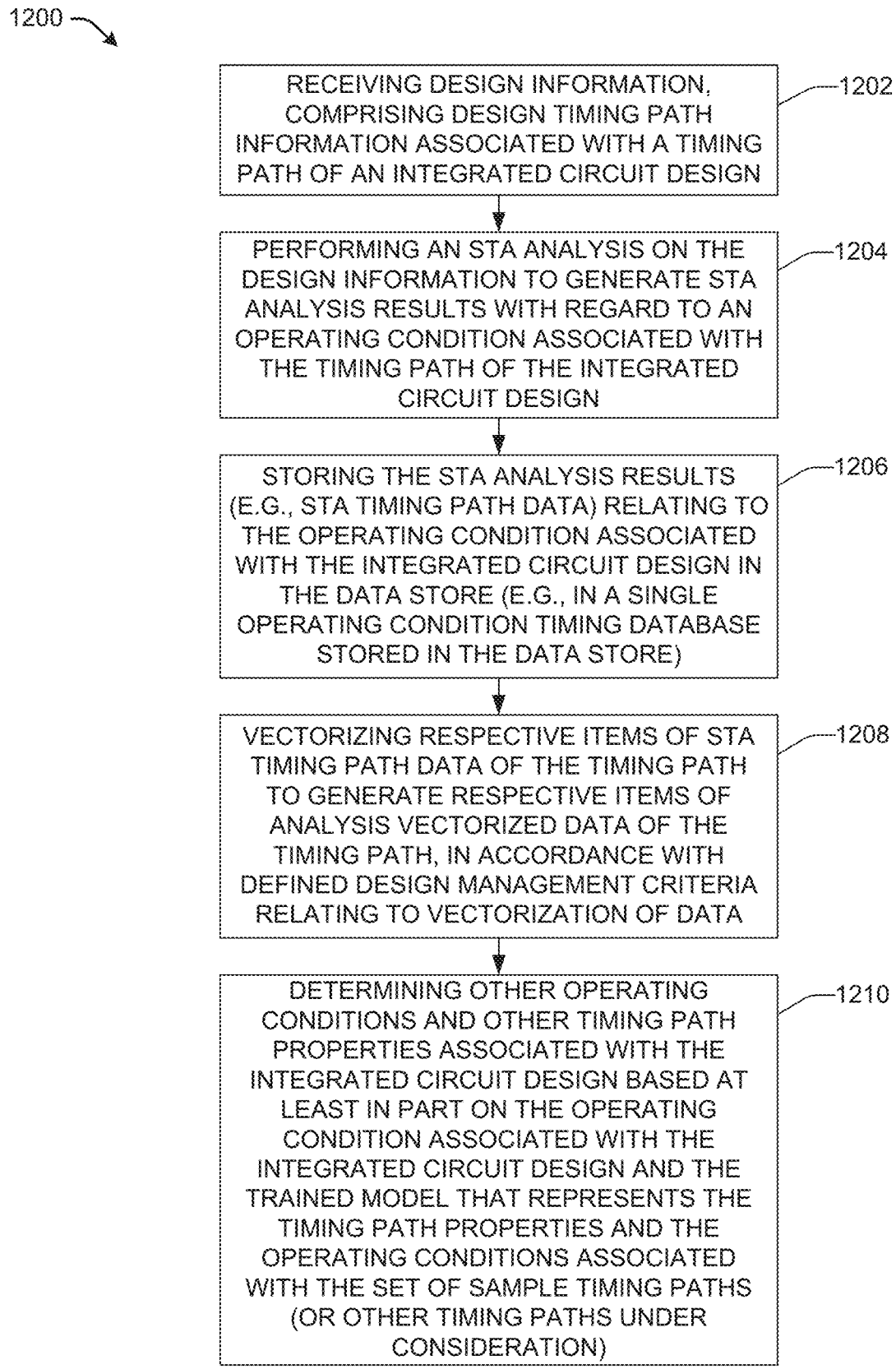
FIG. 12 depicts a flow diagram of an example method that can utilize a trained model that can desirably model or represent timing paths, including sample timing paths, to facilitate predicting the properties, operating conditions, and/or response of timing paths of an integrated circuit design, to efficiently enhance the integrated circuit design, in accordance with various aspects and embodiments of the disclosed subject matter.

FIG. 12 depicts a flow diagram of an example method 1200 that can utilize a trained model that can desirably model or represent timing paths, including sample timing paths, to facilitate predicting the properties, operating conditions, and/or response of timing paths of an integrated circuit design, to efficiently enhance the integrated circuit design, in accordance with various aspects and embodiments of the disclosed subject matter. The method 1200 can be implemented by a system that can comprise the DMC, a processor component, and/or a data store, for example.

At block 1202, design information, comprising design timing path information associated with a timing path of an integrated circuit design, can be received. The DMC can receive the design information from a desired data source(s), which can be a user (e.g., via a user interface associated with the DMC) or a component or device of or associated with the DMC.

At block 1204, an STA analysis can be performed on the design information to generate STA analysis results with regard to an operating condition associated with the timing path of the integrated circuit design. The DMC can employ an STA component that can perform the STA analysis on the design information, or a desired portion thereof, to generate the STA analysis results relating to the operating condition (e.g., a single operating condition) associated with the integrated circuit design (e.g., an operating condition associated with the timing path of the integrated circuit design). While the disclosed subject matter, including the method 1200, can perform the STA analysis on a single operating condition associated with the integrated circuit design (e.g., the timing path of the integrated circuit design), as desired, in certain embodiments, the disclosed subject matter can perform the STA analysis on more than one operating condition (e.g., a relatively small number of operating conditions) associated with the integrated circuit design (e.g., one or more timing paths of the integrated circuit design).

At block 1206, the STA analysis results (e.g., STA timing path data) relating to the operating condition associated with the integrated circuit design can be stored in the data store (e.g., in a single operating condition (e.g., PVT) timing database stored in the data store). In some embodiments, the DMC can store the STA analysis relating to the operating condition in the data store.

At block 1208, respective items of STA timing path data of the timing path can be vectorized to generate respective items of analysis vectorized data of the timing path, in accordance with defined design management criteria relating to vectorization of data. The DMC can vectorize (e.g., perform a vectorization process on) the respective items of STA timing path data of the timing path to generate the respective items of analysis (e.g., STA) vectorized data (e.g., vectorized input data) of the timing path, in accordance with the defined design management criteria relating to vectorization of data, as more fully described herein. The vectorization of the STA timing path data can be same as or similar to the vectorization of simulation data of the sample timing paths. The DMC can determine and generate the respective items of the analysis vectorized data such that they can represent the respective items of STA timing path data of the timing path in a desired numeric form (e.g., as numeric vectors). The DMC can utilize the analysis vectorized data as vectorized input (along with vectorized data from the trained database) into the predictor component employed by the DMC to predict, derive, or determine other operating conditions and other timing path properties associated with the integrated circuit design.

At block 1210, other operating conditions and other timing path properties associated with the integrated circuit design can be determined based at least in part on the operating condition associated with the integrated circuit design and the trained model that represents the timing path properties and the operating conditions associated with the set of sample timing paths (or other timing paths under consideration). The DMC, which can employ the predictor component, can determine or predict the other operating conditions and other timing path properties associated with the integrated circuit design based at least in part on the operating condition associated with the integrated circuit design and the trained model, which can represent the timing path properties and the operating conditions associated with the set of sample timing paths (or other timing paths under consideration), as more fully described herein. For instance, the DMC, employing the predictor component, can analyze the vectorized data of the trained database (e.g., vectorized data as processed during the training of the training model of the trained database) and the vectorized input data associated with the timing path of the integrated circuit design. Based at least in part on the results of analyzing the vectorized data and the vectorized input data, the DMC (e.g., the predictor component of the DMC) can determine or predict the other operating conditions and other timing path properties associated with the integrated circuit design.

Figure 13:
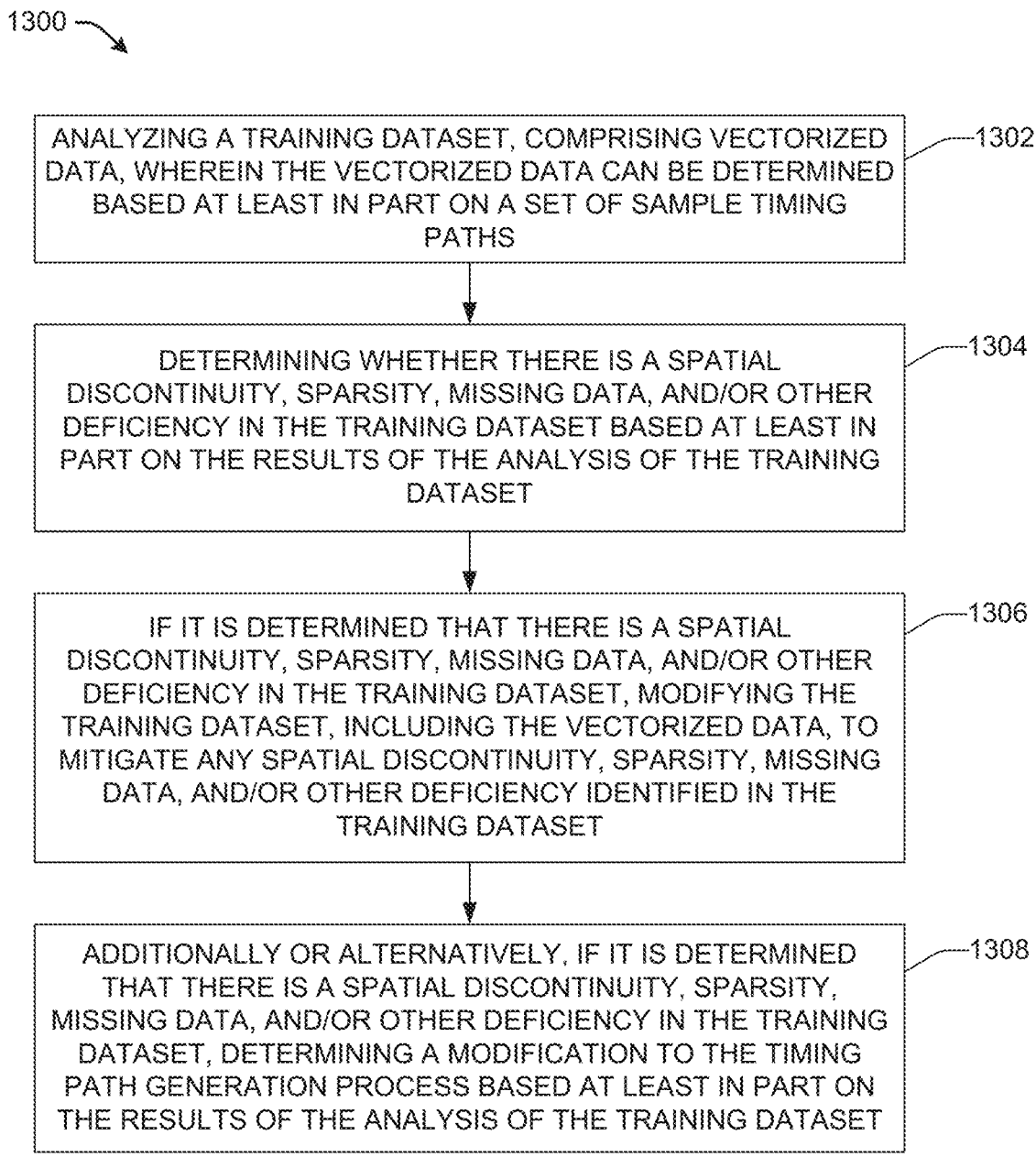
FIG. 13 illustrates a flow diagram of an example method that can determine modifications that can be made to a training dataset, comprising vectorized data (e.g., vectorized dataset), to mitigate spatial discontinuity, missing data, or other deficiency in the training dataset and/or modifications that can be made to the timing path generation process to enhance the generation of sample timing paths in connection with generation of training datasets to mitigate spatial discontinuity, missing data, or other deficiency, in accordance with various aspects and embodiments of the disclosed subject matter.

FIG. 13 illustrates a flow diagram of an example method 1300 that can determine modifications that can be made to a training dataset, comprising vectorized data (e.g., vectorized dataset), to mitigate spatial discontinuity, missing data, or other deficiency in the training dataset and/or modifications that can be made to the timing path generation process to enhance the generation of sample timing paths in connection with generation of training datasets to mitigate spatial discontinuity, missing data, or other deficiency, in accordance with various aspects and embodiments of the disclosed subject matter. The method 1300 can be implemented by a system that can comprise the DMC, a processor component, and/or a data store, for example.

At block 1302, a training dataset, comprising vectorized data, can be analyzed, wherein the vectorized data can be determined based at least in part on a set of sample timing paths. The DMC can analyze the training dataset, comprising the vectorized data, to facilitate determining the quality of the training dataset.

At block 1304, a determination can be made regarding whether there is a spatial discontinuity, sparsity, missing data, and/or other deficiency in the training dataset based at least in part on the results of the analysis of the training dataset. Based at least in part on the results of the analysis of the training dataset, the DMC can determine whether there is a spatial discontinuity, sparsity, missing data, and/or other deficiency in the training dataset. For example, based at least in part on the results of the analysis of the training dataset, the DMC can determine whether there is sparsity or missing data with regard to certain types of data (e.g., vectorized data) relating to certain types of timing paths, gate logic, cell VT, channel length, wire, or other characteristics of timing paths. As another example, based at least in part on the results of the analysis of the training dataset, the DMC can determine whether there is spatial discontinuity between certain items of data (e.g., certain items of vectorized data) in relation to each other, wherein the certain items of data can relate to certain types of timing paths, gate logic, cell VT, channel length, wire, or other characteristics of timing paths.

At block 1306, if it is determined that there is a spatial discontinuity, sparsity, missing data, and/or other deficiency in the training dataset, the training dataset, including the vectorized data, can be modified to mitigate any spatial discontinuity, sparsity, missing data, and/or other deficiency identified in the training dataset. If it is determined that there is a spatial discontinuity, sparsity, missing data, and/or other deficiency in the training dataset, the DMC can determine a modification that can be made to the training dataset to mitigate (e.g., reduce, minimize, or compensate for) any spatial discontinuity, sparsity, missing data, and/or other deficiency identified in the training dataset, based at least in part on the analysis results. The DMC can modify the training dataset to mitigate such spatial discontinuity, sparsity, missing data, and/or other deficiency identified in the training dataset, based at least in part on the determined modification. For example, with regard to sparsity or missing data with respect to the training dataset, the DMC can determine what type(s) of data is sparse with respect to or missing from the training dataset, and can employ localized datapoint generation to determine and generate suitable data (e.g., vectorized data relating to timing paths) to fill in gaps in the training dataset that are due to sparse or missing data.

The DMC can modify the training dataset to include such suitable data to mitigate the sparsity in or missing data from the training dataset.

Additionally or alternatively, at block 1308, if it is determined that there is a spatial discontinuity, sparsity, missing data, and/or other deficiency in the training dataset, a modification to the timing path generation process can be determined based at least in part on the results of the analysis of the training dataset. If it is determined that there is a spatial discontinuity, sparsity, missing data, and/or other deficiency in the training dataset, the DMC can determine the modification to the timing path generation process based at least in part on the results of the analysis of the training dataset. For instance, the DMC can determine a modification to the random number generation (e.g., pseudo-random number generation), the mapping of numbers (e.g., random numbers) to characteristics associated with sample timing paths, and/or another sub-process of the timing path generation process to mitigate such spatial discontinuity, sparsity, missing data, and/or other deficiency identified in the training dataset to result in future training datasets generated by the DMC not having such spatial discontinuity, sparsity, missing data, and/or other deficiency or at least having a reduced or minimized level of such spatial discontinuity, sparsity, missing data, and/or other deficiency. For example, to mitigate sparsity with regard to a particular type of timing path data (e.g., relating to a particular characteristic(s) associated with a sample timing path(s)), and correspondingly sparsity with regard to a particular type of training data (e.g., particular type of vectorized data), the DMC can determine a modification to the random number generation to cause a particular random number(s) associated with the particular type of timing path data to be generated more frequently than it had been in order to cause that particular type of timing path data, and correspondingly the particular type of training data, to be generated more frequently so that it appears more frequently (e.g., less sparsely) in future training datasets generated by the DMC. The DMC can implement the modification to enhance the timing path generation process, and correspondingly, enhance the training datasets produced by the DMC and enhance the training of the trained model.

Figure 14:
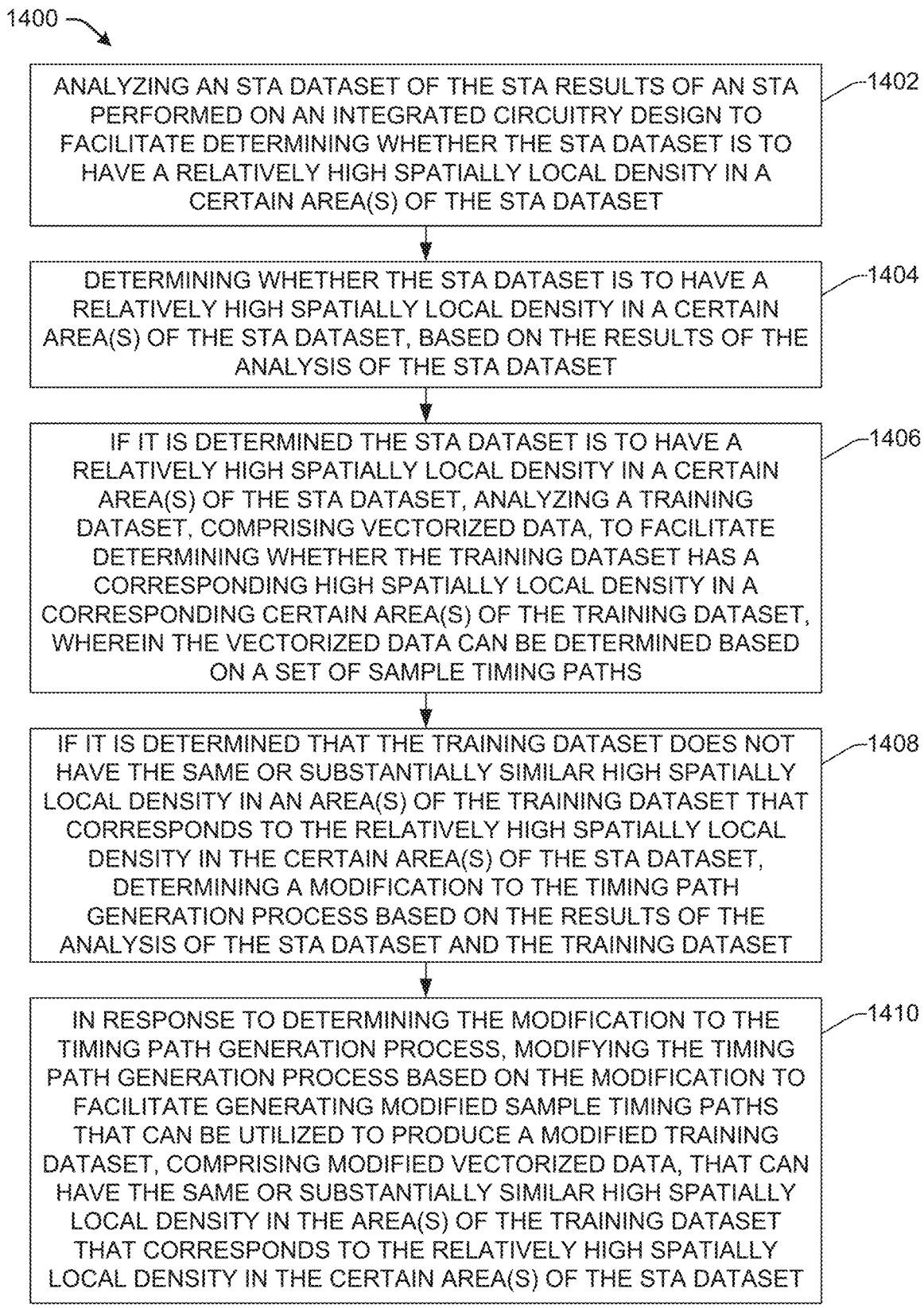
FIG. 14 presents a flow diagram of an example method that can determine modifications to the timing path generation process to account for particular features of static timing analysis (STA) results of an STA performed on integrated circuitry design to enhance the generation of sample timing paths to enhance the quality of training datasets in relation to the STA, in accordance with various aspects and embodiments of the disclosed subject matter.

FIG. 14 presents a flow diagram of an example method 1400 that can determine modifications to the timing path generation process to account for particular features of the STA results of an STA performed on integrated circuitry design to enhance the generation of sample timing paths to enhance the quality of training datasets in relation to the STA, in accordance with various aspects and embodiments of the disclosed subject matter. The method 1400 can be implemented by a system that can comprise the DMC, a processor component, and/or a data store, for example.

At block 1402, an STA dataset of the STA results of an STA performed on an integrated circuitry design can be analyzed to facilitate determining whether the STA dataset is to have a relatively high spatially local density in a certain area(s) of the STA dataset. The STA dataset can be in a vectorized form, which can be the same as or similar to the vectorized format utilized to generate the vectorized data associated with the sample timing paths. The DMC can analyze the STA dataset to facilitate determining whether the STA dataset is to have a relatively high spatially local density in a certain area(s) of the STA dataset.

At block 1404, a determination can be made regarding whether the STA dataset is to have a relatively high spatially local density in a certain area(s) of the STA dataset, based at least in part on the results of the analysis of the STA dataset.

The DMC can determine whether the STA dataset is to have a relatively high spatially local density in a certain area(s) of the STA dataset, based at least in part on the results of the analysis of the STA dataset. For instance, the DMC can identify an area(s), if any, in the STA dataset that has a relatively higher local density relative to other areas of the STA dataset. For example, the integrated circuitry design may employ a relatively higher number of a certain type of timing paths, a relatively higher number of a certain type of gate logic, and/or a relatively higher number of cells having a particular characteristic, as compared to other types of timing paths, other types of gate logic, and/or other types of cells having other characteristics. In such instances, a certain area(s) of the STA dataset of the STA results of the STA performed on the integrated circuitry design can reflect or indicate that the integrated circuitry design has a relatively higher number of a certain type of timing paths, a relatively higher number of a certain type of gate logic, and/or a relatively higher number of cells having a particular characteristic. The DMC can identify such certain area(s) in the STA dataset based at least in part on the results of analyzing the STA dataset.

At block 1406, if it is determined the STA dataset is to have a relatively high spatially local density in a certain area(s) of the STA dataset, a training dataset, comprising vectorized data, can be analyzed to facilitate determining whether the training dataset has a corresponding high spatially local density in a corresponding certain area(s) of the training dataset, wherein the vectorized data can be determined based at least in part on a set of sample timing paths. If it is determined the STA dataset is to have a relatively high spatially local density in a certain area(s) of the STA dataset, the DMC can analyze the training dataset, comprising the vectorized data, to facilitate determining whether the training dataset has a same or similarly high spatially local density in an area(s) of the training dataset that corresponds to the relatively high spatially local density in the certain area(s) of the STA dataset.

At block 1408, if it is determined that the training dataset does not have the same or substantially similar high spatially local density in an area(s) of the training dataset that corresponds to the relatively high spatially local density in the certain area(s) of the STA dataset, a modification to the timing path generation process can be determined based at least in part on the results of the analysis of the STA dataset and the training dataset. If the DMC determines that the training dataset does have the same or substantially similar high spatially local density in an area(s) of the training dataset that corresponds to the relatively high spatially local density in the certain area(s) of the STA dataset, the DMC can determine that no modification to the timing path generation process is to be performed. If, however, the DMC determines that the training dataset does not have the same or substantially similar high spatially local density in an area(s) of the training dataset that corresponds to the relatively high spatially local density in the certain area(s) of the STA dataset, the DMC can determine a modification that can be made to the timing path generation process, based at least in part on the results of the analysis of the STA dataset and the training dataset, to facilitate modifying the generation of sample timing paths. The modification can be or comprise, for example, changing the timing path generation process to result in the generation of sample timing paths that can have a relatively higher number of the certain type of timing paths, a relatively higher number of the certain type of gate logic, and/or a relatively higher number of cells having the particular characteristic to correspond with the integrated circuitry design. The modified sample timing paths can be utilized by the DMC to produce a modified training dataset, comprising modified vectorized data, that can have the same or substantially similar high spatially local density in the area(s) of the training dataset that corresponds to the relatively high spatially local density in the certain area(s) of the STA dataset.

At block 1410, in response to determining the modification to the timing path generation process, the timing path generation process can be modified based at least in part on the modification to facilitate generating modified sample timing paths that can be utilized to produce a modified training dataset, comprising modified vectorized data, that can have the same or substantially similar high spatially local density in the area(s) of the training dataset that corresponds to the relatively high spatially local density in the certain area(s) of the STA dataset. In response to the DMC determining the modification to the timing path generation process, the DMC can modify the timing path generation process, based at least in part on the modification, to facilitate generating the modified sample timing paths. The method 1400 can thereby enhance generation of sample timing paths (e.g., enhance spice path generation).

Example Computing Environment

Figure 15:
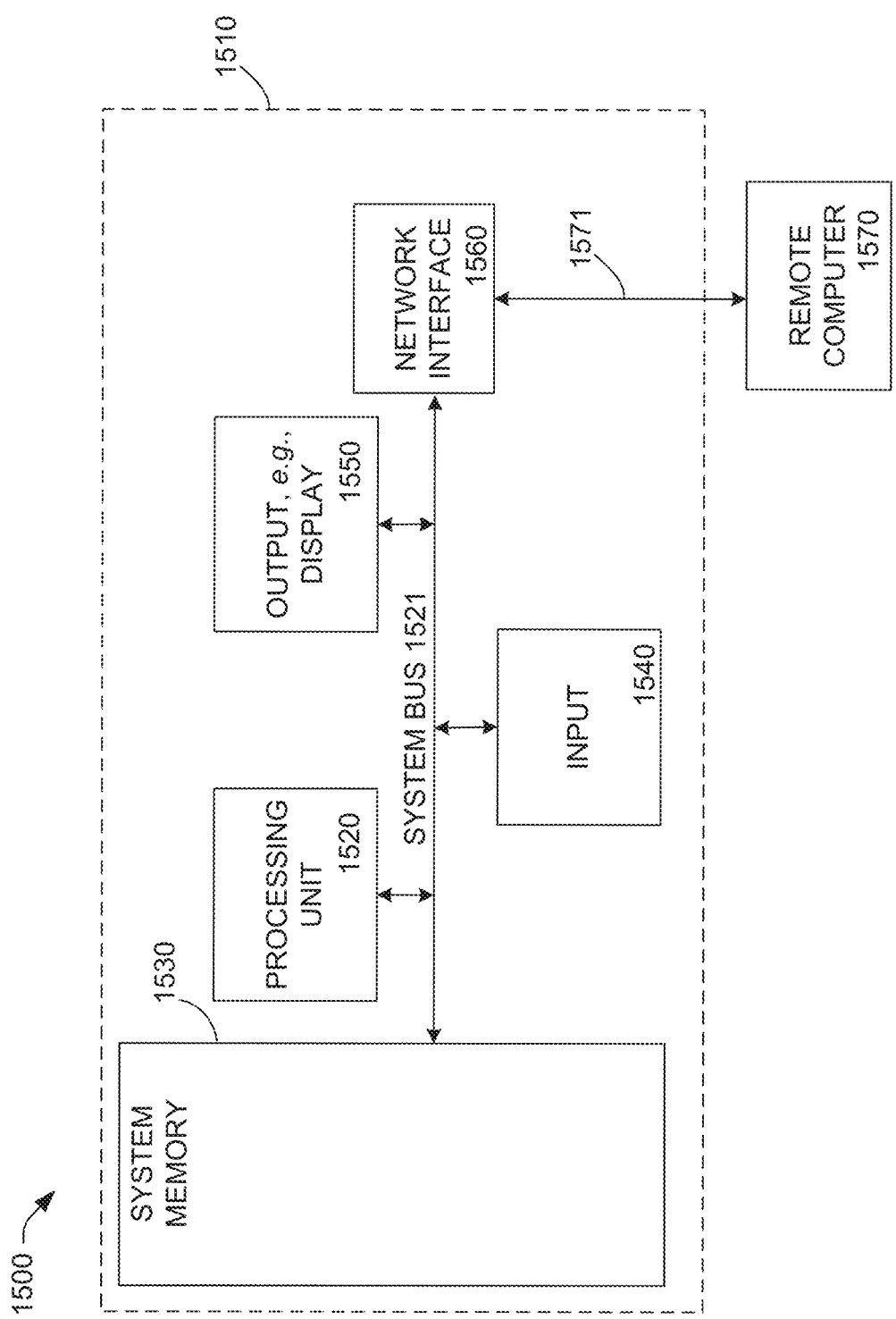
FIG. 15 illustrates a block diagram of an example electronic computing environment that can be implemented in conjunction with one or more aspects described herein.

As mentioned, advantageously, the techniques described herein can be applied to any device and/or network where analysis of data, determining and generating sample timing paths, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design can be desirable in a system comprising a device(s) or component(s) (e.g., design management component, database, trained database, processor component, data store, . . . ). It is to be understood, therefore, that handheld, portable and other computing devices and computing objects of all kinds are contemplated for use in connection with the various non-limiting embodiments, e.g., anywhere that it can be desirable for a device to be employed to facilitate generation of a design management component, database, trained database, processor component, data store, etc., for use, respectively, in the analysis of data, determining and generating sample timing paths, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design, or to be employed to comprise or be associated with a design management component, database, trained database, processor component, data store, etc., to facilitate communication of data in connection with the analysis of data, determining and generating sample timing paths, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design. Accordingly, the below general purpose remote computer described below in FIG. 15 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 15 thus illustrates an example of a suitable computing system environment 1500 in which some aspects of the disclosed subject matter can be implemented, although as made clear above, the computing system environment 1500 is only one example of a suitable computing environment for a device and is not intended to suggest any limitation as to the scope of use or functionality of the disclosed subject matter. Neither should the computing environment 1500 be interpreted as having any dependency or requirement relating to any one or combination of components illustrated in the exemplary operating environment 1500.

With reference to FIG. 15, an exemplary device for implementing the disclosed subject matter includes a general-purpose computing device in the form of a computer 1510. Components of computer 1510 may include, but are not limited to, a processing unit 1520, a system memory 1530, and a system bus 1521 that couples various system components including the system memory to the processing unit 1520. The system bus 1521 may be any of several types of bus structures including a memory bus or memory controller, a peripheral bus, and a local bus using any of a variety of bus architectures.

Computer 1510 typically includes a variety of computer readable media. Computer readable media can be any available media that can be accessed by computer 1510. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media typically embodies computer readable instructions, data structures, program modules, or other data in a modulated data signal such as a carrier wave or other transport mechanism and includes any information delivery media.

The system memory 1530 may include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, may be stored in memory 1530. Memory 1530 typically also contains data and/or program modules that are immediately accessible to and/or presently being operated on by processing unit 1520. By way of example, and not limitation, memory 1530 may also include an operating system, application programs, other program modules, and program data.

The computer 1510 may also include other removable/non-removable, volatile/nonvolatile computer storage media. For example, computer 1510 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1521 through a non-removable memory interface such as an interface, and a magnetic disk drive or optical disk drive is typically connected to the system bus 1521 by a removable memory interface, such as an interface.

A user can enter commands and information into the computer 1510 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1520 through user input 1540 and associated interface(s) that are coupled to the system bus 1521, but may be connected by other interface and bus structures, such as a parallel port, game port, or a universal serial bus (USB). A graphics subsystem can also be connected to the system bus 1521. A projection unit in a projection display device, or a HUD in a viewing device or other type of display device can also be connected to the system bus 1521 via an interface, such as output interface 1550, which may in turn communicate with video memory. In addition to a monitor, computers can also include other peripheral output devices such as speakers which can be connected through output interface 1550.

The computer 1510 can operate in a networked or distributed environment using logical connections to one or more other remote computer(s), such as remote computer 1570, which can in turn have media capabilities different from device 1510. The remote computer 1570 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1510. The logical connections depicted in FIG. 15 include a network 1571, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1510 can be connected to the LAN 1571 through a network interface or adapter. When used in a WAN networking environment, the computer 1510 can typically include a communications component, such as a modem, or other means for establishing communications over the WAN, such as the Internet. A communications component, such as wireless communications component, a modem and so on, which can be internal or external, can be connected to the system bus 1521 via the user input interface of input 1540, or other appropriate mechanism. In a networked environment, program modules depicted relative to the computer 1510, or portions thereof, can be stored in a remote memory storage device. It will be appreciated that the network connections shown and described are exemplary and other means of establishing a communications link between the computers can be used.

Example Networking Environment

Figure 16:
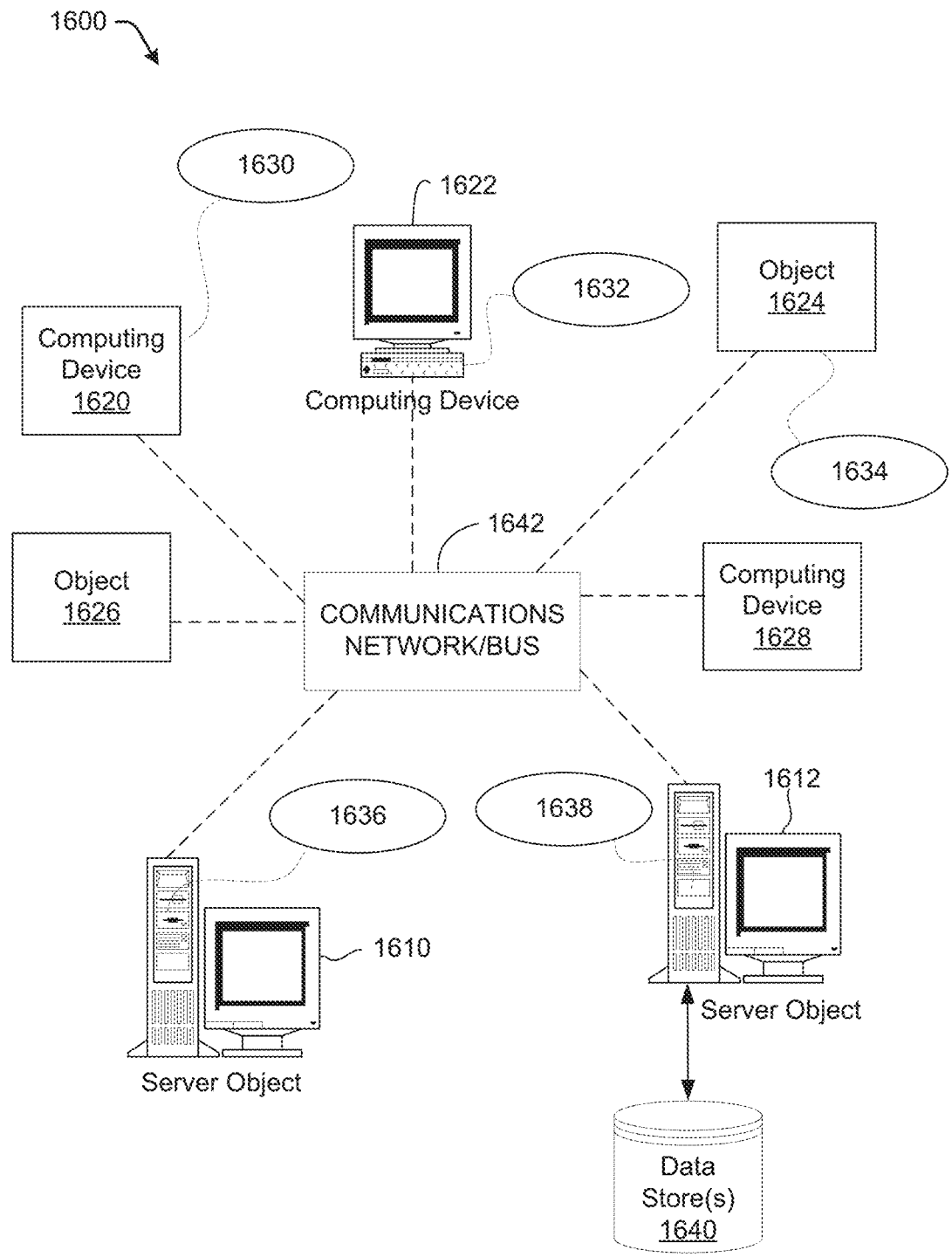
FIG. 16 depicts a block diagram of an example data communication network that can be operable in conjunction with various aspects described herein.

FIG. 16 provides a schematic diagram of an exemplary networked or distributed computing environment 1600. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638 and data store(s) 1640. It can be appreciated that computing objects 1610, 1612, etc. and computing objects or devices 1620, 1622, 1624, 1626, 1628, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1640 can include one or more cache memories, one or more registers, or other similar data stores disclosed herein.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1642, either directly or indirectly. Even though illustrated as a single element in FIG. 16, communications network 1642 may comprise other computing objects and computing devices that provide services to the system of FIG. 16, and/or may represent multiple interconnected networks, which are not shown. Each computing object 1610, 1612, etc. or computing object or devices 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1642 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A method for determining timing path frequency associated with an integrated circuitry design, comprising:
    determining, by a system comprising a processor, respective agnostic timing paths of a set of agnostic timing paths based at least in part on respective characteristics associated with the respective agnostic timing paths, wherein the respective characteristics are determined based at least in part on respective random seed values;
    determining, by the system, a trained model that represents timing path properties and operating conditions of the set of agnostic timing paths based at least in part on an analysis of vectorized information determined from timing path information relating to the respective characteristics associated with the respective agnostic timing paths;
    determining, by the system, an operating condition of a timing path of the integrated circuitry design based at least in part on a static timing analysis performed on design data associated with the integrated circuitry design; and
    determining, by the system, at least one other operating condition associated with the integrated circuitry design based at least in part on the operating condition and the trained model that represents the timing path properties and the operating conditions of the set of agnostic timing paths.

2. The method of claim 1, wherein a subset of the respective characteristics of an agnostic timing path of the set of agnostic timing paths relates to a gate logic function, a cell voltage threshold, a channel length, or a wire associated with the agnostic timing path, and wherein the respective random seed values comprise a random gate logic seed value, a random cell voltage threshold seed value, a random channel length seed value, or a random wire property seed value.

3. The method of claim 2, further comprising:
    determining, by the system, at least one path component of the agnostic timing path based at least in part on the respective characteristics and the respective random seed values, wherein the at least one path component comprises at least one of the gate logic function, the cell voltage threshold, the channel length, or the wire of the agnostic timing path.

4. The method of claim 1, wherein the respective random seed values comprise a random seed value, wherein the respective characteristics comprise a characteristic, wherein the set of agnostic timing paths comprises an agnostic timing path, and the method further comprises:
    mapping, by the system, the random seed value to the characteristic or one or more parameters associated with the characteristic to generate a mapping of the random seed value to the characteristic or the one or more parameters associated with the characteristic.

5. The method of claim 4, further comprising:
    to facilitate determining the agnostic timing path, determining, by the system, the characteristic or the one or more parameters associated with the characteristic that is or are to be associated with the agnostic timing path based at least in part on the mapping and the random seed value.

6. The method of claim 1, wherein the set of agnostic timing paths comprises an agnostic timing path, wherein the agnostic timing path includes a logic gate that comprises an input that is part of the agnostic timing path, and wherein the method further comprises:
    during a simulation of the agnostic timing path, applying, by the system, a signal to the input of the logic gate; and
    generating, by the system, simulation data that simulates a response of the logic gate based at least in part on the signal being applied to the input.

7. The method of claim 6, wherein the input is a first input, the logic gate comprises at least two inputs including the first input that is part of the agnostic timing path and a second input that is not part of the agnostic timing path, the method further comprises:
    determining, by the system, a stimulus signal to apply to the second input of the logic gate during the simulation of the agnostic timing path based at least in part on a logic gate type of the logic gate and a gate connectivity of the logic gate that indicates the second input is not part of the agnostic timing path; and during the simulation of the agnostic timing path, applying, by the system, the signal to the first input and the stimulus signal to the second input of the logic gate.

8. The method of claim 7, further comprising:
generating, by the system, the simulation data that simulates the response of the logic gate to the signal being applied to the first input and the stimulus signal being applied to the second input.

9. The method of claim 1, further comprising:
generating, by the system, a first training dataset, comprising the vectorized information determined from the timing path information, to facilitate training the trained model; and
performing, by the system, a density analysis on the first training dataset to determine whether there is a first spatial discontinuity in, a first sparsity in, or first missing data from the first training dataset.

10. The method of claim 9, further comprising:
in response to determining there is the first spatial discontinuity in, the first sparsity in, or the first missing data from the first training dataset, at least one of:
based at least in part on results of the density analysis, modifying, by the system, the first training dataset to mitigate the first spatial discontinuity in, the first sparsity in, or the first missing data from the first training dataset, or
based at least in part on the results of the density analysis, modifying, by the system, a timing path generation process utilized to determine and generate agnostic timing paths to mitigate a second spatial discontinuity in, a second sparsity in, or second missing data from a second training dataset.

11. The method of claim 1, wherein the operating conditions comprise process-voltage-temperature conditions, and wherein the operation condition comprises a process-voltage-temperature condition.

12. The method of claim 1, further comprising:
generating a training dataset, comprising vectorized data that is determined based at least in part on the timing path information associated with the set of sample timing paths, and, based at least in part on the training dataset, determines the trained model.

13. The method of claim 12, further comprising:
analyzing the training dataset, comprising the vectorized data, and determining whether there is a spatial discontinuity in, a sparsity in, or missing data from the training dataset based at least in part on results of the analysis of the training dataset.

14. The method of claim 13, further comprising:
in response to determining that there is the spatial discontinuity in, the sparsity in, or the missing data from the training dataset, determining a modification to the training dataset to mitigate the spatial discontinuity in, the sparsity in, or the missing data from the training dataset, based at least in part on the results of the analysis of the training dataset, and modifying the training dataset based at least in part on the modification.

15. The method of claim 13, wherein the training dataset is a first training dataset, wherein the spatial discontinuity is a first spatial discontinuity, the sparsity is a first sparsity, and the missing data is first missing data, further comprising:
in response to determining that there is the first spatial discontinuity in, the first sparsity in, or the first missing data from the first training dataset, determining a modification to a timing path generation process utilized to determine and generate sample timing paths to mitigate a second spatial discontinuity in, a second sparsity in, or second missing data from a second training dataset, based at least in part on the results of the analysis of the first training dataset, and modifying the timing path generation process based at least in part on the modification.

16. The method of claim 12, further comprising:
analyzing a static timing analysis dataset resulting from the static timing analysis performed on the design information and, based at least in part on the results of the analysis of the static timing analysis dataset, determining whether the static timing analysis dataset is to have a defined high spatially local density in a portion of the static timing analysis dataset.

17. The method of claim 1, further comprising:
generating analysis timing path data associated with the timing path of the integrated circuitry design, based at least in part on the static timing analysis, and converting the analysis timing path data to facilitate generation of vectorized input data that represents the analysis timing path data as a numerical vector.

18. A method of improving integrated circuit design by employing multi-operating condition frequency prediction for statically timed designs, comprising:
determining, by a system comprising a processor, respective agnostic timing paths of a set of agnostic timing paths based at least in part on respective characteristics associated with the respective agnostic timing paths, wherein the respective characteristics are determined based at least in part on respective random seed values;
determining, by the system, a trained model that represents timing path properties and operating conditions of the set of agnostic timing paths based at least in part on an analysis of vectorized information determined from timing path information relating to the respective characteristics associated with the respective agnostic timing paths;
determining, by the system, an operating condition of a timing path of the integrated circuitry design based at least in part on a static timing analysis performed on design data associated with the integrated circuitry design; and
determining, by the system, at least one other operating condition associated with the integrated circuitry design based at least in part on the operating condition and the trained model that represents the timing path properties and the operating conditions of the set of agnostic timing paths.

19. The method of claim 18, wherein a subset of the respective characteristics of an agnostic timing path of the set of agnostic timing paths relates to a gate logic function, a cell voltage threshold, a channel length, or a wire associated with the agnostic timing path, and wherein the respective random seed values comprise a random gate logic seed value, a random cell voltage threshold seed value, a random channel length seed value, or a random wire property seed value.

20. The method of claim 19, further comprising:
determining, by the system, at least one path component of the agnostic timing path based at least in part on the respective characteristics and the respective random seed values, wherein the at least one path component comprises at least one of the gate logic function, the cell voltage threshold, the channel length, or the wire of the agnostic timing path.

\* \* \* \* \*